United States Patent
Itoh et al.

(10) Patent No.: US 10,766,714 B2
(45) Date of Patent: Sep. 8, 2020

(54) LIFTING DEVICE AND SPORTING DEVICE

(71) Applicant: ITOH DENKI CO., LTD., Kasai-shi, Hyogo (JP)

(72) Inventors: Kazuo Itoh, Kasai (JP); Tatsuhiko Nakamura, Kasai (JP); Takuya Nagasawa, Kasai (JP)

(73) Assignee: Itoh Denki Co., Ltd., Hyogo (JP)

( * ) Notice: Subject to any disclaimer, the term of this patent is extended or adjusted under 35 U.S.C. 154(b) by 0 days.

(21) Appl. No.: 16/621,817

(22) PCT Filed: Jun. 22, 2017

(86) PCT No.: PCT/JP2017/023075
§ 371 (c)(1),
(2) Date: Dec. 12, 2019

(87) PCT Pub. No.: WO2018/235240
PCT Pub. Date: Dec. 27, 2018

(65) Prior Publication Data
US 2020/0122935 A1 Apr. 23, 2020

(51) Int. Cl.
*B65G 47/57* (2006.01)
*B65G 47/52* (2006.01)
*B65G 17/00* (2006.01)

(52) U.S. Cl.
CPC .............. *B65G 47/57* (2013.01); *B65G 47/52* (2013.01); *B65G 17/005* (2013.01)

(58) Field of Classification Search
CPC ...... B65G 47/52; B65G 47/57; B65G 47/643; B65G 2201/0285; B65G 13/00; B65G 17/005; B65G 17/345; B65G 1/06
(Continued)

(56) References Cited

U.S. PATENT DOCUMENTS 3,403,799 A * 10/1968 Sindzinski ............ B66B 11/006
 414/564
4,465,177 A * 8/1984 Dorner ................... B65G 47/57
 198/475.1
(Continued)

FOREIGN PATENT DOCUMENTS

EP 0847943 A2 6/1998
JP 61-206574 U 10/1986
(Continued)

OTHER PUBLICATIONS

International Preliminary Report on Patentability and Written Opinion of the International Searching Authority, dated Dec. 24, 2019 in International Patent Application No. PCT/JP2017/023075.

*Primary Examiner* — James R Bidwell
(74) *Attorney, Agent, or Firm* — Wood, Phillips, Katz, Clark & Mortimer

(57) ABSTRACT

A lifting device 1 includes an upper station 2, a lower station 3, and lifting and lowering placing tables 10 and 11. The upper station 2 and the lower station 3 have horizontal placing tables 5 and 6, respectively. The horizontal placing tables 5 and 6 move only in the horizontal direction. The lifting and lowering placing tables 10 and 11 move only in the vertical direction. When any of the lifting and lowering placing tables 10 and 11 is in the upper station 2, the upper side horizontal placing table 5 is at a position adjacent to the lifting and lowering placing tables 10 and 11 to form a series of conveying passages. When the lifting and lowering placing tables 10 and 11 move away from the upper station 2, the upper side horizontal placing table 5 moves to a position where the lifting and lowering placing tables 10 and 11 used to exist. When the lifting and lowering placing tables 10 and 11 move away from the lower station 3, the lower side
(Continued)

horizontal placing table 6 moves to a position where the lifting and lowering placing tables 10 and 11 used to exist.

12 Claims, 15 Drawing Sheets

(58) Field of Classification Search
USPC .......... 198/435, 802, 347.1; 414/278, 331.14
See application file for complete search history.

(56) References Cited

U.S. PATENT DOCUMENTS

| | | | | |
|---|---|---|---|---|
| 6,220,420 B1* | 4/2001 | Jan | .................... | B65G 47/268 |
| | | | | 198/369.1 |
| 6,394,257 B1* | 5/2002 | Wheeler | .............. | B65G 47/643 |
| | | | | 198/369.6 |
| 7,434,675 B1* | 10/2008 | Rohm | ................ | H05K 13/0061 |
| | | | | 198/346.2 |
| 7,699,158 B2* | 4/2010 | Aust | ..................... | B65G 47/643 |
| | | | | 198/369.1 |
| 9,022,204 B2* | 5/2015 | Wang | ................... | B65G 47/643 |
| | | | | 198/435 |
| 10,597,237 B2* | 3/2020 | Itoh | ....................... | B65G 47/643 |
| 2010/0108464 A1* | 5/2010 | Davi | ..................... | B65G 47/57 |
| | | | | 198/347.1 |
| 2010/0316468 A1* | 12/2010 | Lert | ........................ | B65G 1/10 |
| | | | | 414/273 |
| 2014/0311857 A1* | 10/2014 | Wang | ................... | B65G 47/643 |
| | | | | 198/346.2 |
| 2017/0050809 A1* | 2/2017 | Itoh | ........................ | B65G 13/12 |

FOREIGN PATENT DOCUMENTS

| | | |
|---|---|---|
| JP | 61-168025 U | 12/1986 |
| JP | 2003104541 A | 4/2003 |
| JP | 2006016203 A | 1/2006 |

* cited by examiner

LIFTING DEVICE AND SPORTING DEVICE

TECHNICAL FIELD

The present invention relates to a lifting device and a sorting device for moving a conveyance object in a vertical direction. The lifting device and the sorting device of the present invention are used, for example, for transferring a conveyance object between upper and lower conveyors by being disposed in a three-dimensional conveyor line. Further, the lifting device and the sorting device of the present invention are also used for changing a discharge destination and a receiving destination of a conveyance object.

BACKGROUND ART

A postal service company and a courier service company perform work of sorting collected parcels, packages, and the like by destination. For example, collected packages and the like are gathered in a specific sorting area, where they are sorted by destination and loaded onto a truck or the like. In the sorting area, conveyor lines are provided vertically and horizontally, and the collected packages are gathered according to destination. Here, in the conveyor line in the sorting area, a plurality of auxiliary conveying passages (child conveying passages) are branched from a main conveying passage, and further a plurality of auxiliary conveying passages (grandchild conveying passages) and great-grandchild conveying passages are branched.

Further, in recent years, the sorting is performed more in detail, and there is a situation where a conveyor line needs to be further complicated. For this reason, the conveyor line is assembled three-dimensionally, a horizontal conveying passage is provided above or below another horizontal conveying passage, and a package is transferred between the upper and lower horizontal conveying passages. As a lifting device used for such an application, for example, there is one that lifts and lowers a lifting and lowering table with a pantograph mechanism. Further, Patent Document 1 discloses an invention in which a wire rope is suspended on a pulley provided with a drive motor, and a frame-type carriage connected to the wire rope is moved up and down in a height direction to convey a conveyance object.

PRIOR ART DOCUMENT

Patent Document

Patent Document 1: JP 2006-16203 A

DISCLOSURE OF INVENTION

Technical Problem

A lifting device of the conventional technique has a station on a lower side and a station on an upper side, and a single lifting and lowering table or the like can be considered to reciprocate between these stations. For this reason, the lifting device of the conventional technique has a disadvantage of poor conveyance efficiency. That is, in the lifting device of the conventional technique, when a conveyance object is transferred from the conveyor installed in a lower part to the conveyor installed in an upper part, the conveyance object is carried from the conveyor on the lower side to the station on the lower side of the lifting device. Then, the lifting and lowering table or the like is moved up to move the conveyance object to the station on the upper side. Thereafter, the conveyance object is carried out from the station on the upper side to the conveyor on the upper side.

For this reason, when the lifting and lowering table or the like is on the station on the upper side of the lifting device, the lifting and lowering table or the like does not exist on the station on the lower side, and a conveyance object cannot be carried into the lifting device. For this reason, in the lifting device of the conventional technique, a conveyance object needs to be put on standby in front of the lifting device until the arrival of the lifting and lowering table or the like.

In view of the above problem of the conventional technique, an object of the present invention is to provide a lifting device with high conveyance efficiency. Further, an object of the present invention is to provide a sorting device that can sort a conveyance object efficiently.

Solution to Problem

In order to solve the above problem, according to an aspect of the present invention, there is provided a lifting device including: an upper station; a lower station; a plurality of lifting and lowering placing tables that move in a vertical direction between the upper station and the lower station; one or a plurality of upper side horizontal placing tables that move horizontally in the upper station; and one or a plurality of lower side horizontal placing tables that move horizontally in the lower station, wherein when one of the lifting and lowering placing tables is in the upper station, the upper side horizontal placing table is at a position adjacent to the lifting and lowering placing table, and the upper side horizontal placing table and the lifting and lowering placing table form a series of conveying passage, wherein when the lifting and lowering placing table moves away from the upper station, the upper side horizontal placing table moves to a position where the lifting and lowering placing table used to exist, wherein when one of the lifting and lowering placing tables is in the lower station, the lower side horizontal placing table is at a position adjacent to the lifting and lowering placing table, and the lower side horizontal placing table and the lifting and lowering placing table form a series of conveying passage, and wherein when the lifting and lowering placing table moves away from the lower station, the lower side horizontal placing table moves to a position where the lifting and lowering placing table used to exist.

The lifting device according to the present aspect includes a plurality of lifting and lowering placing tables. For this reason, when one of the lifting and lowering placing tables is in the upper station, the other lifting and lowering placing table can be retained in the lower station. Similarly, when one of the lifting and lowering placing tables is in the lower station, the other lifting and lowering placing table can be retained in the upper station. Therefore, for example, while a conveyance object on the upper station is being discharged from the lifting device, a conveyance object can be carried onto the placing table in the lower station.

Further, in the lifting device of the present aspect, the upper station has the upper side horizontal placing table, and the lower station has the lower side horizontal placing table. Then, when the lifting and lowering placing table is in the upper station, the upper side horizontal placing table is at a position adjacent to the lifting and lowering placing table and the upper side horizontal placing table and the lifting and lowering placing table form a series of conveying passage. For this reason, when the lifting and lowering placing table is in the upper station, a conveyance object can be carried onto the lifting and lowering placing table and a conveyance object can be carried out from the lifting and lowering placing table.

Similarly, also when the lifting and lowering placing table is in the lower station, a conveyance object can be carried onto the lifting and lowering placing table and a conveyance object can be carried out from the lifting and lowering placing table.

Further, when the lifting and lowering placing table moves away from the upper station, the upper side horizontal placing table moves to a position where the lifting and lowering placing table used to exist, and empty space is formed at another position of the upper station, so that another one of the lifting and lowering placing table can be placed in the empty space.

The above similarly applies to the lower station, and when the lifting and lowering placing table moves away from the lower station, the lower side horizontal placing table moves to a position where the lifting and lowering placing table used to exist, and empty space is formed at another position of the lower station, so that another one of the lifting and lowering placing table can be placed in the empty space.

The lifting and lowering placing table, the upper side horizontal placing table, and the lower side horizontal placing table are preferably all mounted with a conveyor device.

According to the present aspect, a conveyance object can be smoothly carried onto the lifting and lowering placing table and a conveyance object can be smoothly carried out from the lifting and lowering placing table.

It is preferable that the plurality of lifting and lowering placing tables are connected by a linear member, the plurality of lifting and lowering placing tables include a first and a second lifting and lowering placing tables, and when the first lifting and lowering placing table moves upward, the second lifting and lowering placing table moves downward, and when the first lifting and lowering placing table moves downward, the second lifting and lowering placing table moves upward.

According to the present aspect, since the lifting and lowering placing tables are moved up and down synchronously, there is little waste of time.

It is preferable that the lifting device further including a first side-surface side and a second side-surface side, wherein the lower station is configured to carry in and/or carry out a conveyance object from the first side-surface side and/or the second side-surface side of the lifting device, wherein the upper station is configured to carry in and/or carry out a conveyance object from the first side-surface side and/or the second side-surface side of the lifting device, and wherein the lifting device is configured to carry a conveyance object through at least any of following routes:

(1) a first route configured to carry in a conveyance object from the first side-surface side in the lower station and to carry out the conveyance object to the second side-surface side in the upper station, or configured to carry in a conveyance object from the second side-surface side in the lower station and to carry out the conveyance object to the first side-surface side in the upper station;

(2) a second route configured to carry in a conveyance object from the first side-surface side in the lower station and to carry out the conveyance object to the second side-surface side in the lower station, or configured to carry in a conveyance object from the second side-surface side in the lower station and to carry out the conveyance object to the first side-surface side in the lower station;

(3) a third route configured to carry in a conveyance object from the first side-surface side in the lower station and to carry out the conveyance object to the first side-surface side in the upper station, or configured to carry in a conveyance object from the second side-surface side in the lower station and to carry out the conveyance object to the second side-surface side in the upper station;

(4) a fourth route configured to carry in a conveyance object from the first side-surface side in the upper station and to carry out the conveyance object to the second side-surface side in the lower station, or configured to carry in a conveyance object from the second side-surface side in the upper station and to carry out the conveyance object to the first side-surface side in the lower station;

(5) a fifth route configured to carry in a conveyance object from the first side-surface side in the upper station and to carry out the conveyance object to the second side-surface side in the upper station, or configured to carry in a conveyance object from the second side-surface side in the upper station and to carry out the conveyance object to the first side-surface side in the upper station; and (6) a sixth route configured to carry in a conveyance object from the first side-surface side in the upper station and to carry out the conveyance object to the first side-surface side in the lower station, or configured to carry in a conveyance object from the second side-surface side in the upper station and to carry out the conveyance object to the second side-surface side in the lower station.

The lifting device may include a plurality of the upper stations.

According to an aspect regarding a sorting device, a sorting device including: a plurality of stations disposed at positions having different heights, each of the stations having a plurality of areas in which a placing table is disposed; a plurality of lifting and lowering placing tables that move between the stations, the plurality of lifting and lowering placing tables including a first and second lifting and lowering placing tables; and horizontal placing tables provided in each of the stations, the horizontal placing tables moving horizontally in each of the stations, wherein when the first lifting and lowering placing table is in one of the areas in one of the stations, the horizontal placing table in the one of the stations is provided adjacent to the first lifting and lowering placing table, so that the horizontal placing table and the first lifting and lowering placing table form a series of conveying passage, and wherein when the first lifting and lowering placing table moves away from the station, the horizontal placing table moves to a position where the first lifting and lowering placing table used to exist, and an area where the horizontal placing table used to exist becomes empty, thereby the second lifting and lowering placing table being accommodated in the area that becomes empty.

Effect of Invention

The lifting device and the sorting device of the present invention have upper and lower stations, and can carry a conveyance object to a lifting and lowering placing table of one of the stations while a conveyance object is discharged from the lifting and lowering placing table in the other station. For this reason, the lifting device and the sorting device of the present invention have high conveyance efficiency. Further, in a case where the lifting device and the sorting device of the present invention are used for sorting conveyance objects, sorting efficiency is high.

BEST MODE FOR CARRYING OUT THE INVENTION

Hereinafter, embodiments of the present invention will be further described.

Figure 1:
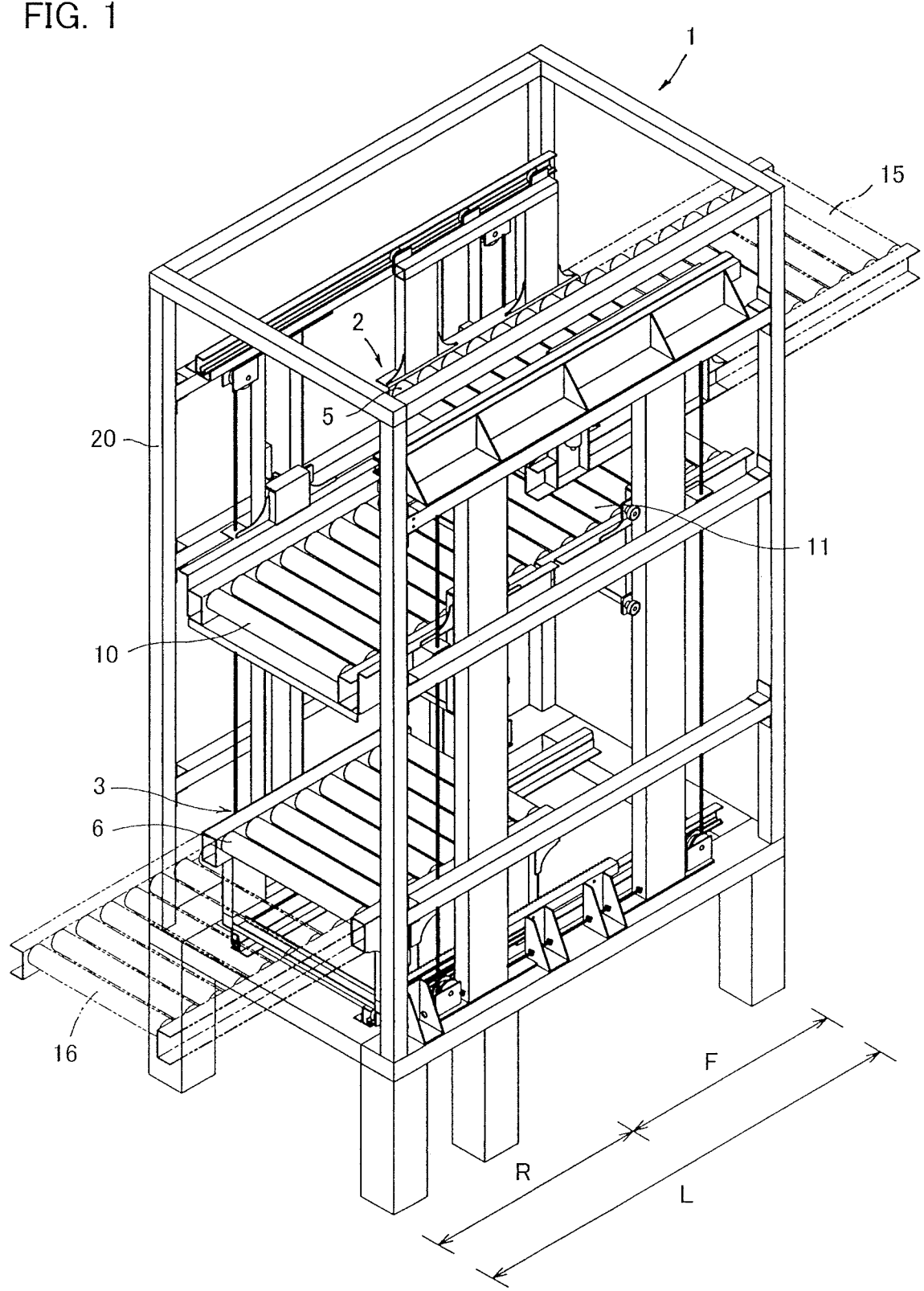
FIG. 1 is a perspective view of a lifting device (sorting device) and a peripheral device of the lifting device (sorting device) according to an embodiment of the present invention.

The device shown in FIG. 1 is used as a device for lifting and lowering a conveyance object and changing a discharge destination and a receiving destination of a conveyance object. The device shown in FIG. 1 can be used as a lifting device and a sorting device. Hereinafter, the device shown in FIG. 1 will be explained as a lifting device 1.

Figure 8:
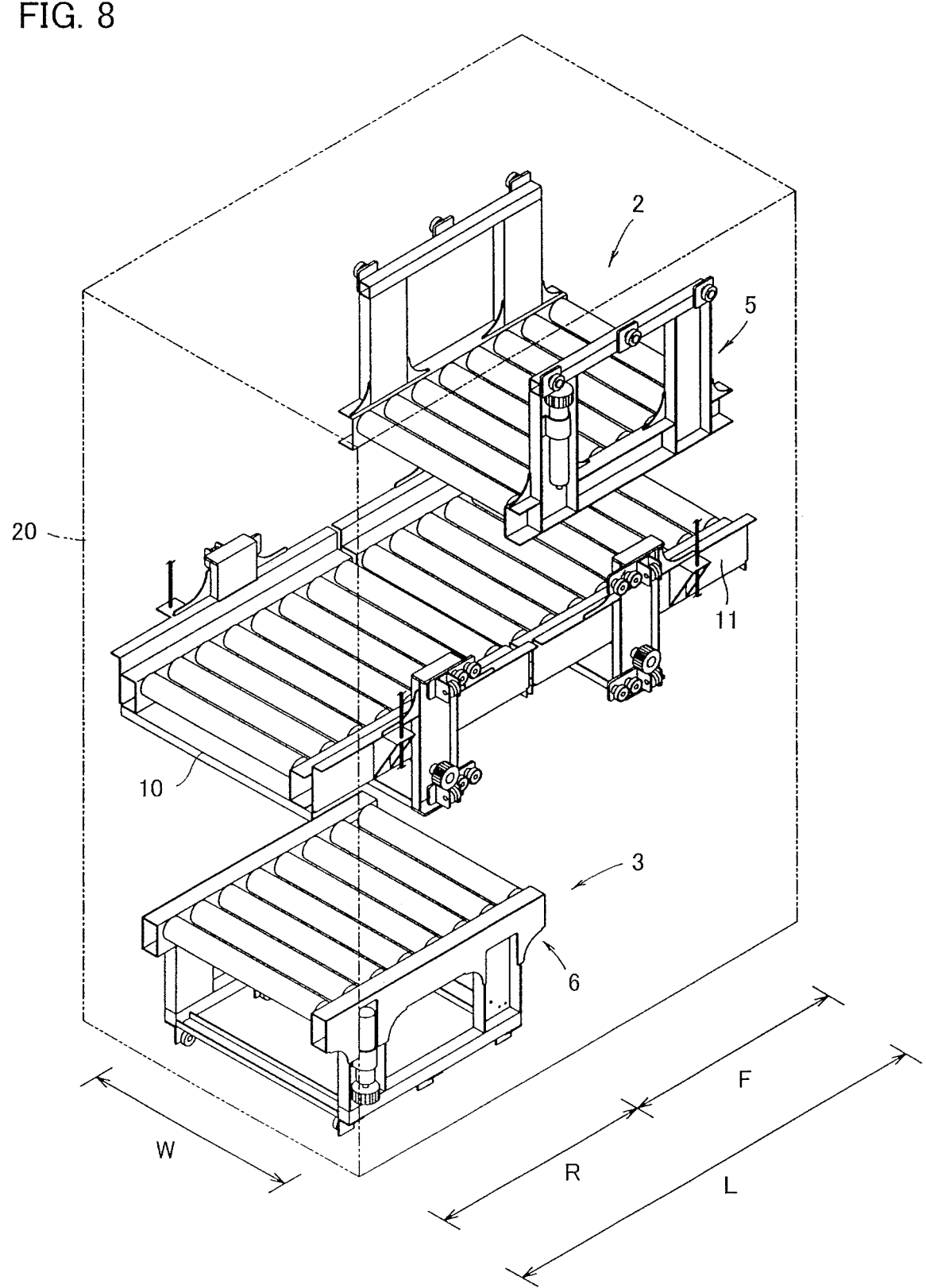
FIG. 8 is a perspective view showing a relationship between an upper side horizontal placing table, a lower side horizontal placing table, and the lifting and lowering placing table of the lifting device of FIG. 1.
Figure 9:
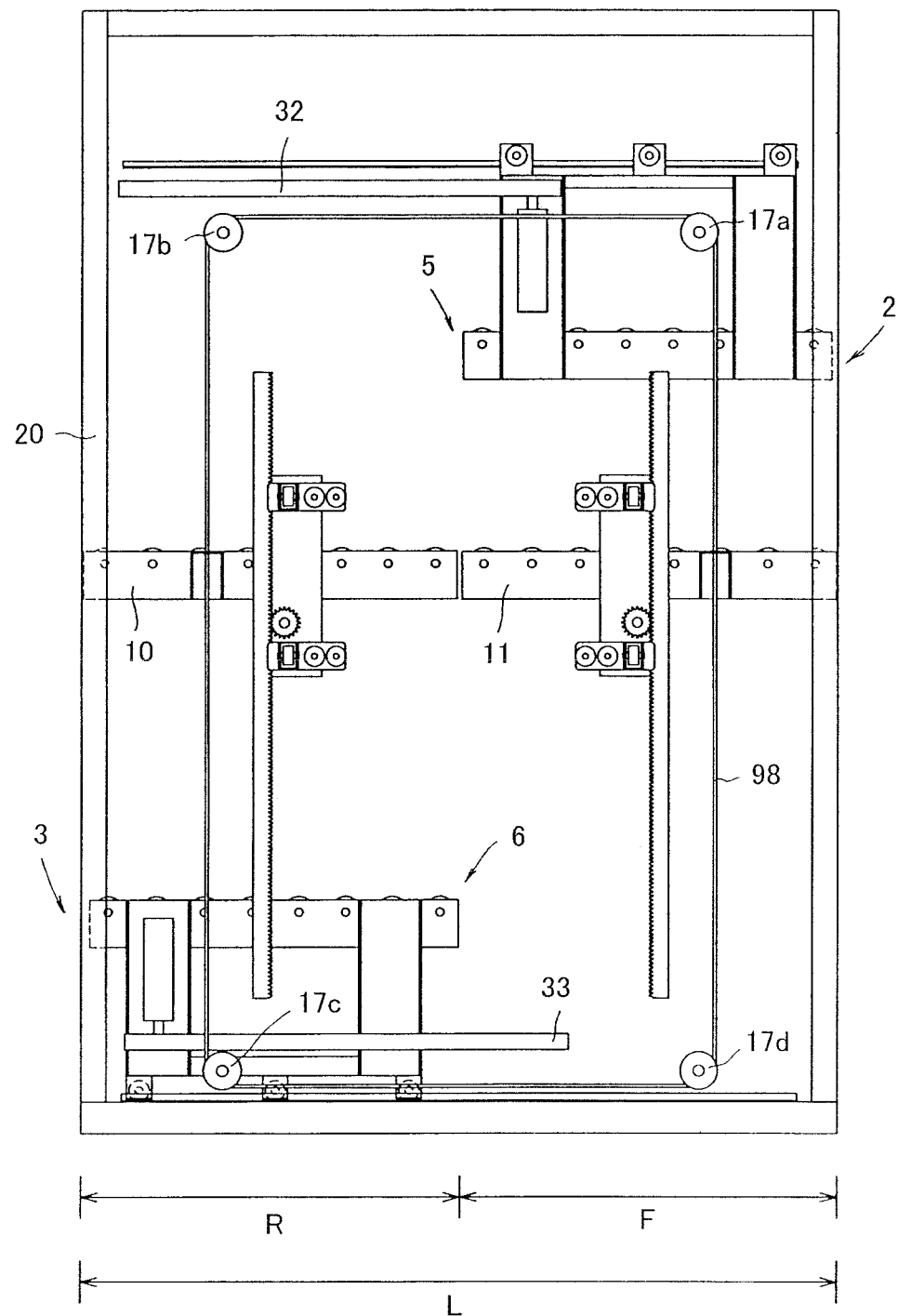
FIG. 9 is a front view showing the upper side horizontal placing table, the lower side horizontal placing table, and the lifting and lowering placing table of the lifting device of FIG. 1.

The lifting device (sorting device) 1 has an upper station 2 and a lower station 3 as shown in FIGS. 1, 8, and 9. Here, the stations 2 and 3 are places for loading and unloading a conveyance object. In the present embodiment, the lower station 3 is a portion that carries a conveyance object 100 in the lifting device 1, and the upper station 2 is a portion that carries the conveyance object 100 out of the lifting device 1.

The upper station 2 and the lower station 3 have horizontal placing tables 5 and 6, respectively. That is, the upper station 2 has the upper side horizontal placing table 5, and the lower station 3 has the lower side horizontal placing table 6. The upper side horizontal placing table 5 is a placing table that is in the upper station 2 and moves only in the horizontal direction. On the other hand, the lower side horizontal placing table 6 is a placing table that is in the lower station 3 and moves only in the horizontal direction.

Both the upper side horizontal placing table 5 and the lower side horizontal placing table 6 are equipped with a small conveyor device, and can convey the conveyance object 100 linearly.

Further, the lifting device 1 includes two lifting and lowering placing tables 10 and 11 as shown in FIGS. 1, 8, and 9. The lifting and lowering placing tables 10 and 11 move between the upper station 2 and the lower station 3 only in the vertical direction. A small conveyor device is also mounted on the lifting and lowering placing tables 10 and 11, and the conveyance object 100 can be conveyed linearly.

There are an upper conveyor 15 and a lower conveyor 16 as equipment attached to the lifting device 1.

Hereinafter, details will be described. The lifting device 1 of the present embodiment has a frame-like frame 20 as shown in FIG. 1. The frame 20 has a total length L in which the lifting and lowering placing tables 10 and 11 can be arranged in a row. Further, the frame 20 has a width W in which the lifting and lowering placing tables 10 and 11 can be placed.

The frame 20 is largely divided into two areas. That is, the frame 20 has the total length L, and the inside of the frame 20 is largely divided into a front area F and a rear area R in the longitudinal direction.

Figure 2:
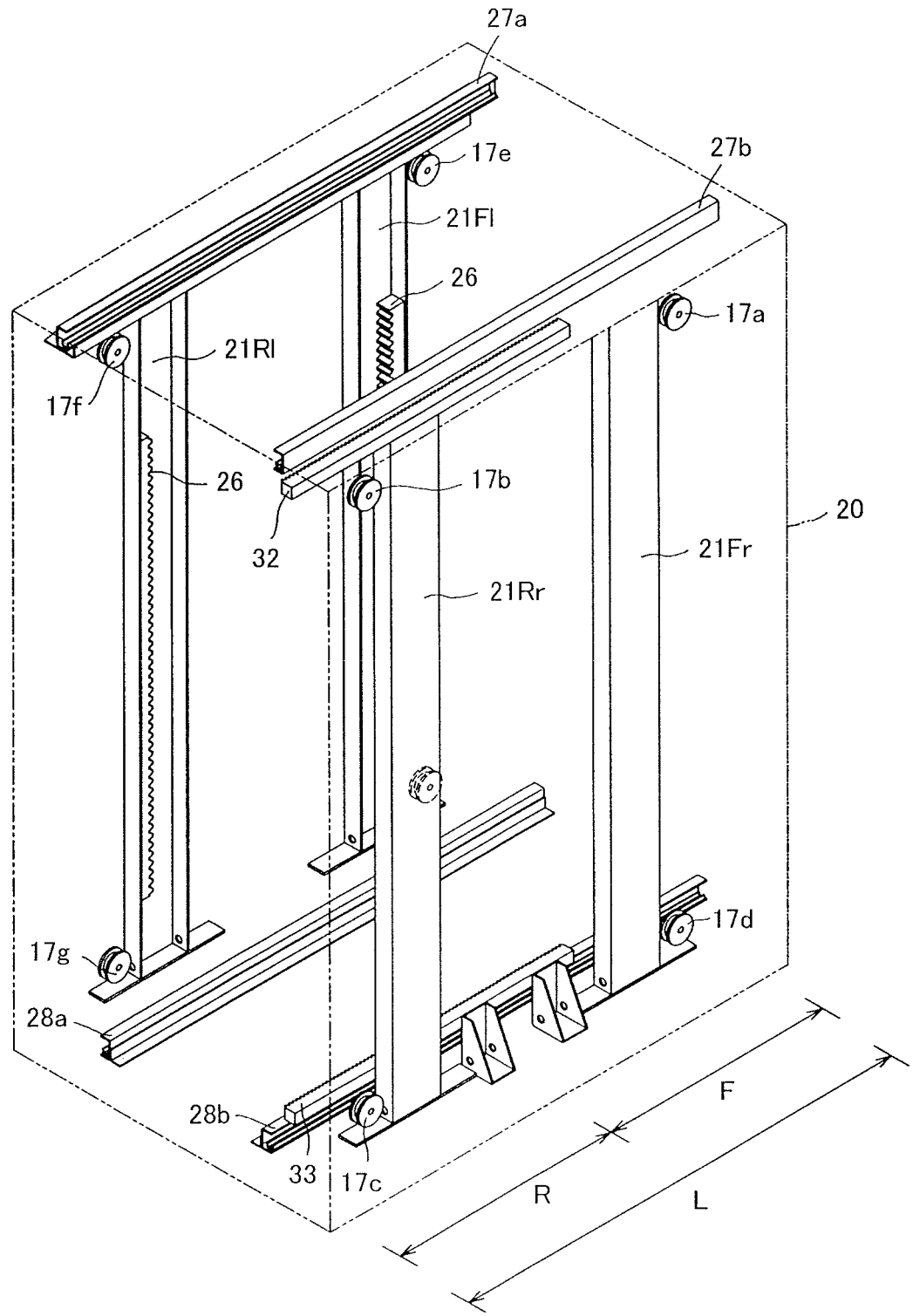
FIG. 2 is a perspective view of a guide and a rack attached to a frame of the lifting device of FIG. 1.

As shown in FIG. 2, the frame 20 is provided with four vertical guides 21, four horizontal rails 27 and 28, and two horizontal racks 32 and 33. Further, a vertical rack 26 is provided in each of the vertical guides 21.

Figure 5:
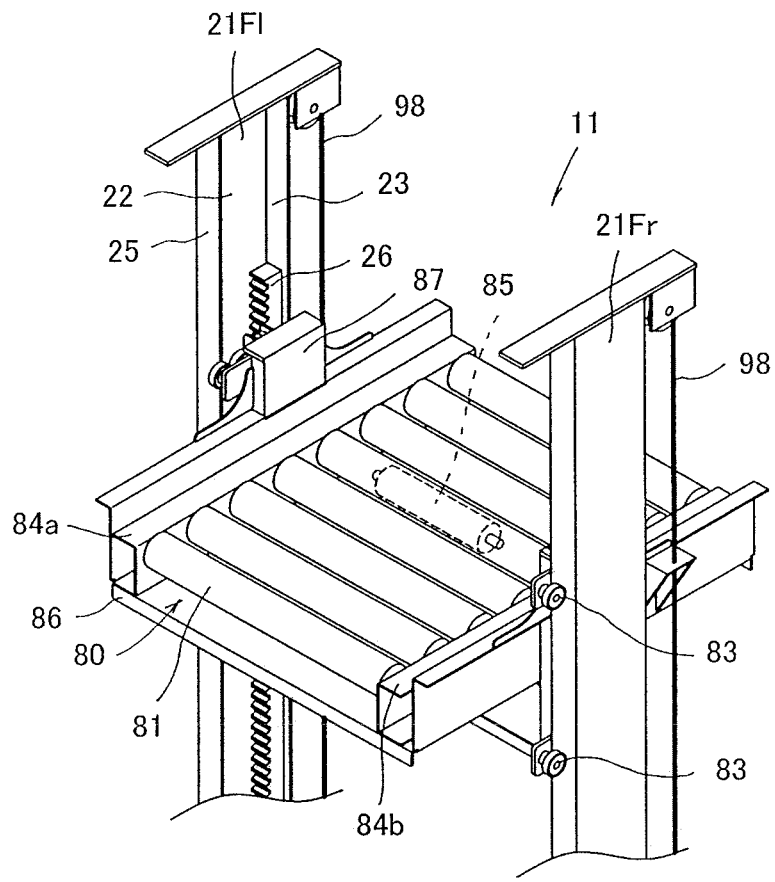
FIG. 5 is a perspective view of a lifting and lowering placing table, a vertical guide, and a vertical rack of the lifting device of FIG. 1.
Figure 7:
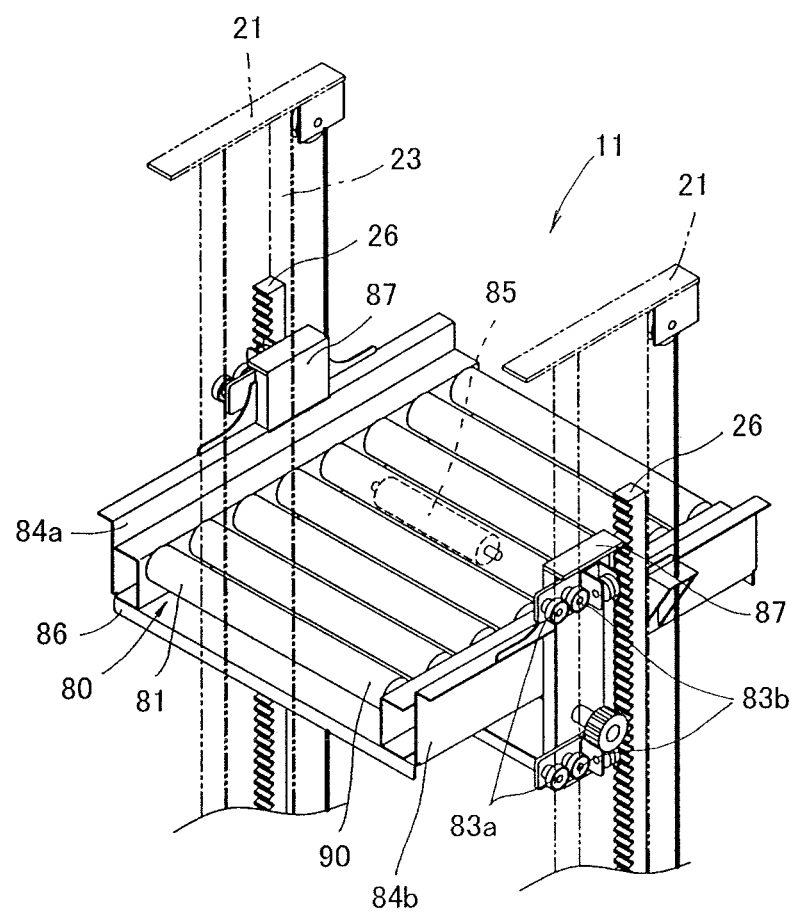
FIG. 7 is a perspective view showing a relationship between the lifting and lowering placing table, the vertical guide, and the vertical rack of the lifting device of FIG. 1.

Specifically, a pair of the vertical guides 21 is provided so as to face each other in each of the front area F and the rear area R of the frame 20. That is, the front area F has vertical guides 21Fr and 21Fl on both width sides of the front area F. Further, the rear area R has vertical guides 21Rr and 21Rl on both width sides of the rear area R. All the vertical guides 21 are installed in a vertical posture. As shown in FIGS. 5 and 7, the vertical guide 21 has a cross section in a groove shape, and includes a basic wall portion 22 and left and right wing wall portions 23 and 25. Then, the vertical rack 26 is installed on an inner side of the one wing wall portion 23. Further, in the present embodiment, the other wing wall portion 25 functions as a guide.

In the present embodiment, pulleys 17 are provided in the vicinity of upper and lower ends of four of the vertical guides 21. When the arrangement of the pulleys 17 is explained with the frame 20 at the center, four pulleys 17a, 17b, 17c, and 17d are provided on one surface side on one side in the width direction of the frame 20. Four of the pulleys 17a, 17b, 17c, and 17d provided on one surface side constitute the same plane. Similarly, four pulleys 17e, 17f, 17g, and 17h are provided on one surface side on the other side in the width direction of the frame 20. Four of the pulleys 17e, 17f, 17g, and 17h provided on the other surface side are also on the same plane.

Further, the frame 20 is provided with a pair of upper side horizontal rails 27a and 27b and a pair of lower side horizontal rails 28a and 28b. Both the upper side horizontal rails 27a and 27b have a groove shape in its cross section, and are installed at positions near an upper part of the frame 20. The upper side horizontal rails 27a and 27b extend in the horizontal direction, have a length that extends over substantially the entire length of the frame 20, and are provided across the front area F and the rear area R.

The lower side horizontal rails 28a and 28b also have a cross section in a groove shape. The lower side horizontal rails 28a and 28b are installed at positions near a lower part of the frame 20. The lower side horizontal rails 28a and 28b extend in the horizontal direction, have a length that extends over substantially the entire length of the frame 20, and are provided across the front area F and the rear area R.

The upper side horizontal rack 32 is installed under one upper side horizontal rail 27b. The upper side horizontal rack 32 is installed horizontally and is parallel to the upper side horizontal rail 27b. Further, the lower side horizontal rack 33 is installed on one lower side horizontal rail 28b. The lower side horizontal rack 33 is installed horizontally and is parallel to the lower side horizontal rail 28b.

Figure 3:
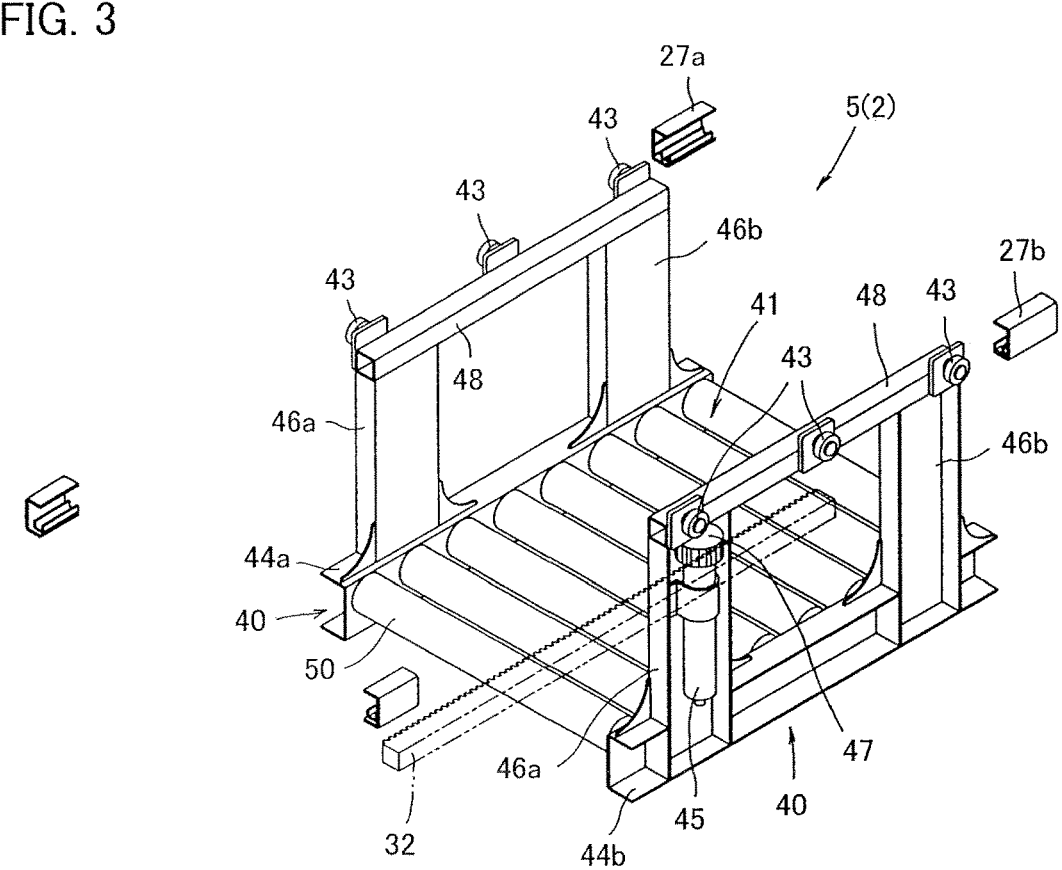
FIG. 3 is a perspective view of an upper side horizontal placing table, an upper side horizontal rail, and an upper side horizontal rack of the lifting device of FIG. 1.

Next, the upper side horizontal placing table 5 will be described. The upper side horizontal placing table 5 includes a moving table 40, a conveyor unit 41, a hanging short roller 43, and a traveling motor 45, as shown in FIG. 3. The moving table 40 is a member that constitutes a frame of the upper side horizontal placing table 5, and is a member that is framed in a quadrangular shape by a steel material. That is, the moving table 40 has side members 44a and 44b arranged horizontally and a connecting member (not shown) for connecting the side members 44a and 44b, and is framed in a quadrangular shape.

The side members 44a and 44b are provided with two hanging pieces 46a and 46b. Then, upper ends of the hanging pieces 46a and 46b are connected by a beam member 48, and a hanging short roller 43 is attached to the beam member 48. The hanging short roller 43 is provided outward with respect to the beam member 48 and can freely rotate.

The traveling motor 45 is fixed to one side member 44b. The traveling motor 45 is attached so that a rotation shaft is in a vertical posture. A pinion gear 47 is attached to an output shaft of the traveling motor 45.

A conveyor unit 41 is provided in a frame-shaped portion of the moving table 40. The conveyor unit 41 has the same structure as a well-known roller conveyor, and a plurality of rollers 50 are provided between the side members 44a and 44b of the moving table 40. Each of the rollers 50 is connected by a belt (not shown) and interlocks. Further, one of the rollers 50 is a motor-incorporating roller, and rotates by supplying power to an internal motor. That is, one of the rollers 50 has a motor and a speed reducer in a roller body, and has a driving force and rotates. The other rollers 50 are idling rollers, and are follower rollers that are rotated by power transmission from a motor-incorporating roller via a belt.

Next, the lower side horizontal placing table 6 will be described. The lower side horizontal placing table 6 has a structure as if the upper side horizontal placing table 5 is turned upside down.

Figure 4:
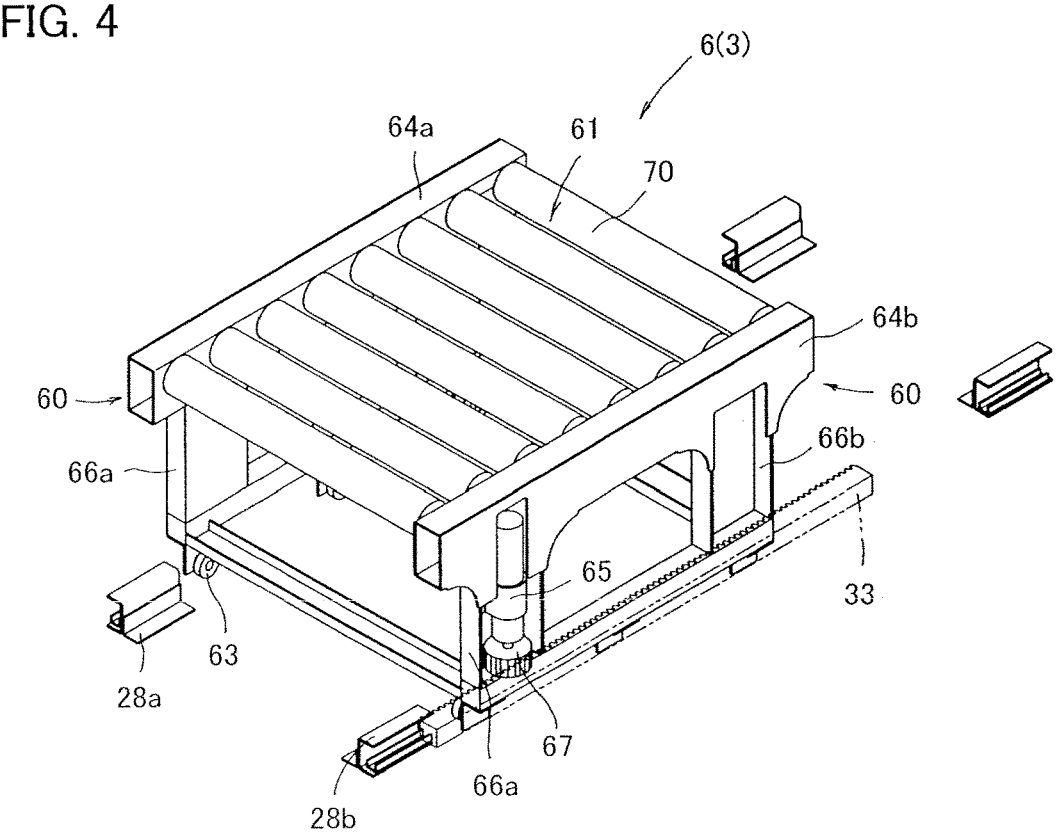
FIG. 4 is a perspective view of a lower side horizontal placing table, a lower side horizontal rail, and a lower side horizontal rack of the lifting device of FIG. 1.

The lower side horizontal placing table 6 also includes a moving table 60, a conveyor unit 61, a traveling short roller 63, and a traveling motor 65, as shown in FIG. 4. The moving table 60 is a member that constitutes the frame of the lower side horizontal placing table 6, is a member that is framed in a quadrangular shape by a steel member, has side members 64a and 64b that are horizontally disposed and a connecting member (not shown) that connects the side members 64a and 64b, and is framed in a quadrangular shape. The side members 64a and 64b are provided with two leg members 66a and 66b. The traveling short roller 63 is attached to a lower end portion of the leg members 66a and 66b. The traveling short roller 63 is provided inwardly on each of the leg member 66a and 66b, and can freely rotate.

The traveling motor 65 is fixed to one side member 64b. The traveling motor 65 is attached so that a rotation shaft is in a vertical posture. A pinion gear 67 is attached to an output shaft of the traveling motor 65.

The conveyor unit 61 is provided in a frame-shaped portion of the moving table 60. The conveyor unit 61 has the same structure as a well-known roller conveyor, and a plurality of rollers 70 are provided between the side members 64a and 64b of the moving table 60. Each of the rollers 70 is connected by a belt (not shown) and interlocks. Further, one of the rollers 70 is a motor-incorporating roller, and the other rollers 70 are idling rollers.

Next, the lifting and lowering placing tables 10 and 11 will be described. Since two of the lifting and lowering placing tables 10 and 11 have the same configuration, the lifting and lowering placing table 11 on the right side of the diagram will be described first.

As shown in FIG. 5, the lifting and lowering placing table 11 includes a lifting and lowering table 80, a conveyor unit 81, a clamping short roller 83 that functions as a lifting and lowering guide roller, and a lifting and lowering motor 85. The lifting and lowering table 80 is a member that constitutes a frame of the lifting and lowering placing table 10, and is a member that is framed in a quadrangular shape by a steel material. That is, the lifting and lowering table 80 has side members 84a and 84b arranged horizontally and a connecting member 86 for connecting the side members 84a and 84b, and is framed in a quadrangular shape.

A posture support piece 87 is provided on each of the side members 84a and 84b. The posture support piece 87 extends in the vertical direction. A pair of the clamping short rollers 83 is attached in the vicinity of upper and lower end portions of the posture support piece 87. As shown in FIG. 7, the clamping short roller 83 is configured with a pair of clamping short rollers 83a and 83b facing each other with a predetermined interval between them.

The clamping short rollers 83a and 83b can freely rotate.

Figure 6:
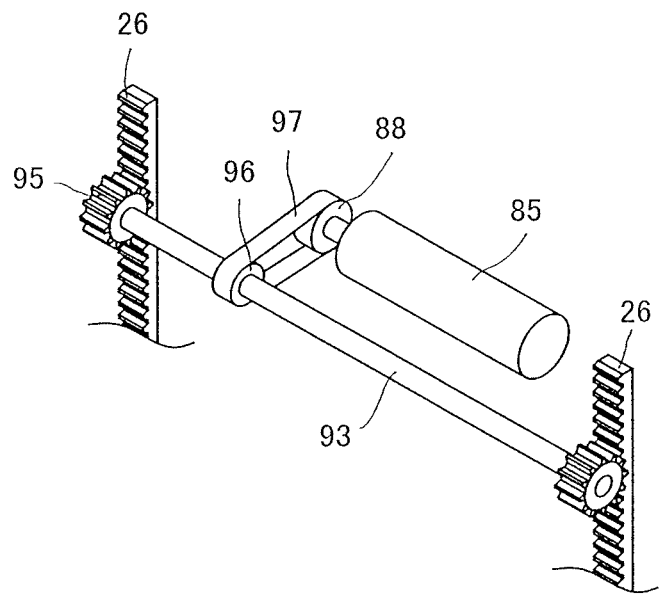
FIG. 6 is a perspective view of a lifting and lowering mechanism of the lifting and lowering placing table of the lifting device of FIG. 1.

The lifting and lowering motor 85 is fixed to a bottom portion of the lifting and lowering table 80 as shown in FIG. 6. The lifting and lowering motor 85 is attached so that a rotation shaft is in a horizontal posture. A toothed pulley 88 is attached to an output shaft of the lifting and lowering motor 85.

Further, a drive shaft 93 is rotatably provided in parallel with the lifting and lowering motor 85. Then, pinion gears 95 are provided at both ends of the drive shaft 93. A toothed pulley 96 is attached to an intermediate portion of the drive shaft 93.

A toothed belt 97 is wound around the toothed pulley 88 fixed to the lifting and lowering motor 85 and the toothed pulley 96 attached to the drive shaft 93.

The conveyor unit 81 is provided in the frame-shaped portion of the lifting and lowering table 80. The structure of the conveyor unit 81 is the same as that of the upper side horizontal placing table 5 described above, and a plurality of rollers 90 are provided between the side members 84a and 84b. Each of the rollers 90 is connected by a belt (not shown) and interlocks. Further, one of the rollers 90 is a motor-incorporating roller, and the other rollers 90 are idling rollers.

The other lifting and lowering placing table 10 is the same as the right lifting and lowering placing table 11.

Next, a correlation between the members will be described.

The upper side horizontal placing table 5 is on an upper side of the frame 20 and is installed in a posture suspended from the upper side horizontal rails 27a and 27b of the frame 20. That is, the hanging short roller 43 of the upper side horizontal placing table 5 is engaged with the upper side horizontal rails 27a and 27b, and the moving table 40 is suspended by the hanging pieces 46a and 46b.

Further, the pinion gear 47 attached to the traveling motor 45 of the upper side horizontal placing table 5 is engaged with the upper side horizontal rack 32. For this reason, when the traveling motor 45 is rotated, the moving table 40 of the upper side horizontal placing table 5 moves in the horizontal direction.

The lower side horizontal placing table 6 is on the lower side of the frame 20, and is installed in a posture rising from the lower side horizontal rails 28a and 28b of the frame 20. That is, the traveling short roller 63 of the lower side horizontal placing table 6 is engaged with the lower side horizontal rails 28a and 28b, and the moving table 60 is supported at a position at a certain height by the leg members 66a and 66b.

The pinion gear 67 attached to the traveling motor 65 of the lower side horizontal placing table 6 is engaged with the lower side horizontal rack 33. For this reason, when the traveling motor 65 is rotated, the moving table 60 of the lower side horizontal placing table 6 moves in the horizontal direction.

The lifting and lowering placing table 10 is in the rear area R of the frame 20, and a pair of the clamping short rollers 83a and 83b provided on the posture support piece 87 are engaged with the wing wall portions 25 of the vertical guides 21Rr and 21Rl. That is, the wing wall portion 25 of the vertical guide 21 is sandwiched between a pair of the clamping short rollers 83a and 83b. Further, the pinion gears 95 provided at both ends of the drive shaft 93 are engaged with the vertical racks 26 in the vertical guides 21Rr and 21Rl. For this reason, when the lifting and lowering motor 85 is rotated, the lifting and lowering table 80 of the lifting and lowering placing table 10 is moved in the horizontal direction.

Further, the other lifting and lowering placing table 11 is in the front area F of the frame 20, and a pair of the clamping short rollers 83a and 83b provided on the posture support piece 87 are engaged with the wing wall portions 25 of the vertical guides 21Fr and 21Fl. Further, the pinion gears 95 provided at both ends of the drive shaft 93 are engaged with the vertical racks 26 in the vertical guides 21Fr and 21Fl.

The lifting and lowering placing table 11 on the front area F side moves up and down following the lifting and lowering placing table 10 in the rear area R. That is, the lifting and lowering placing table 11 on the front area F side and the lifting and lowering placing table 10 on the rear area R side are connected by four linear members 98, such as wires.

Figure 14:
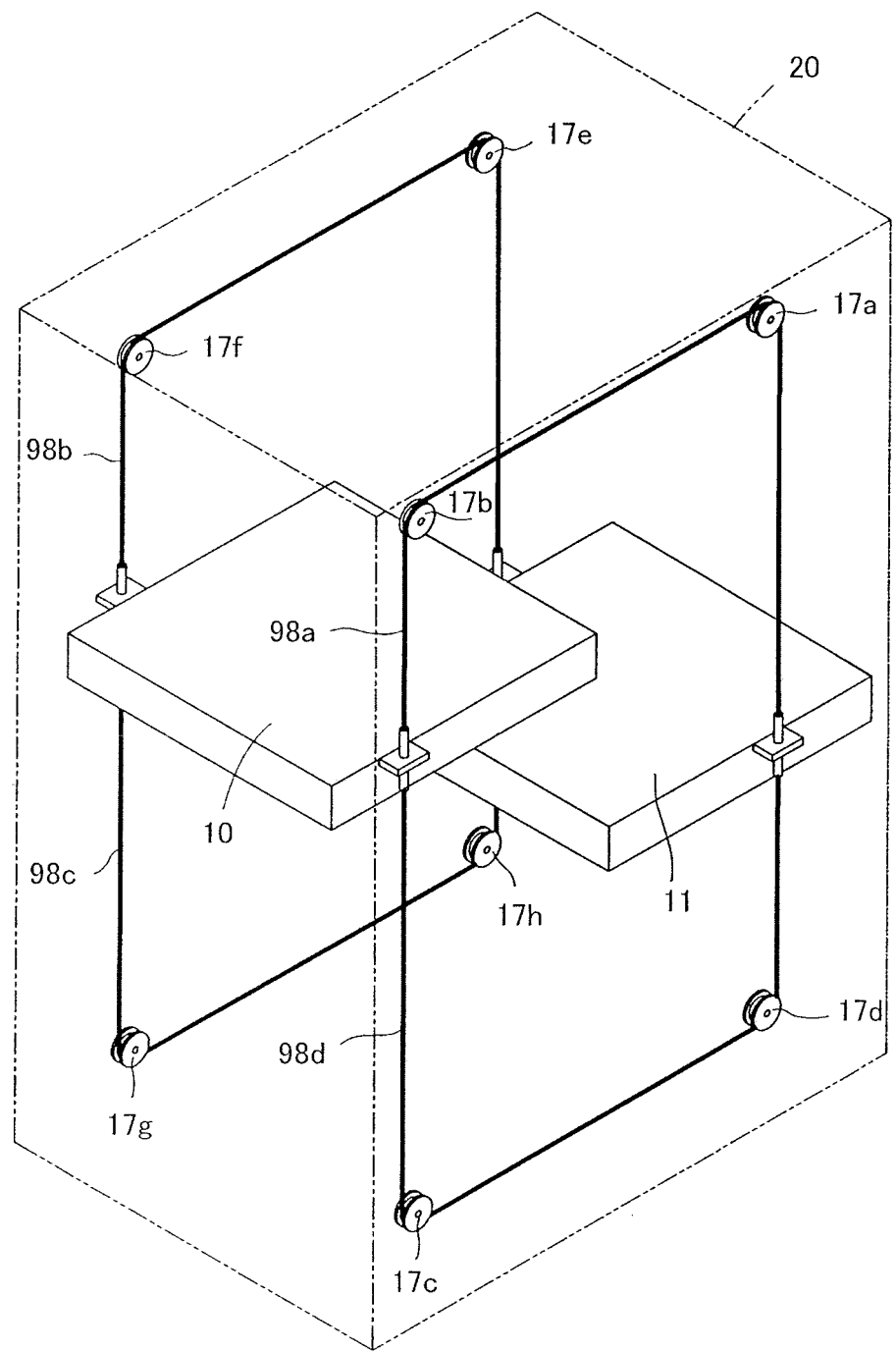
FIG. 14 is a perspective view for explaining a relationship between the lifting and lowering placing table, a linear member, and a pulley of the lifting device of FIG. 1.

Specifically, upper surfaces of the lifting and lowering placing table 10 and the lifting and lowering placing table 11 are connected by two linear members 98a and 98b as shown in FIG. 14. Further, intermediate portions of two of the linear members 98a and 98b are wound around four of the pulleys 17a, 17b, 17f, and 17e on the upper side, and the traveling direction is changed. Similarly, the lower surfaces of the lifting and lowering placing table 10 and the lifting and lowering placing table 11 are connected by two linear members 98c and 98d. Further, intermediate portions of two of the linear members 98c and 98d are wound around four of the pulleys 17c, 17d, 17g, and 17h on the lower side, and the traveling direction is changed.

In the present embodiment, on one side-surface side of the frame 20, two of the linear members 98a and 98d suspended by four of the pulleys 17a, 17b, 17c, and 17d constituting the same plane are connected in an annular shape through the lifting and lowering placing table 10 and the lifting and lowering placing table 11. The above similarly applies to the other side-surface side of the frame 20, and two of the linear members 98b and 98c suspended by four of the pulleys 17e, 17f, 17g, and 17h constituting the same plane are connected in an annular shape through the lifting and lowering placing table 10 and the lifting and lowering placing table 11. For this reason, as for the lifting and lowering placing table 11 on the front area F side and the lifting and lowering placing table 10 on the rear area R side, if one moves up due to the action of the linear member (wire) 98 and the pulley 17, the other moves down, and if one moves down, the other moves up. That is, the lifting and lowering placing table 11 on the front area F side always moves up and down in the opposite direction to the lifting and lowering placing table 10 in the rear area R.

In the lifting device 1 of the present embodiment, the upper side horizontal placing table 5 is always on the upper side of the frame 20, and the moving table 40 is always at a certain high location. That is, the moving table 40 of the upper side horizontal placing table 5 is always in the upper station 2 and moves only in the horizontal direction by driving of the traveling motor 45. The moving table 40 of the upper side horizontal placing table 5 is always in the upper station 2 and reciprocates between the rear area R and the front area F.

The lower side horizontal placing table 6 is always on the lower side of the frame 20, and the moving table 60 is always at a certain low position. That is, the moving table 60 of the lower side horizontal placing table 6 is always in the lower station 3 and moves only in the horizontal direction by driving of the traveling motor 65. The moving table 60 of the lower side horizontal placing table 6 is always in the lower station 3 and reciprocates between the rear area R and the front area F.

In contrast, the lifting and lowering placing table 10 is always in the rear area R of the frame 20 and reciprocates between the upper station 2 and the lower station 3. The lifting and lowering placing table 11 is always in the front area F of the frame 20 and reciprocates between the upper station 2 and the lower station 3.

Then, in the lifting device 1 of the present embodiment, when the lifting and lowering placing tables 10 and 11 are moved up and down and empty space is formed in the upper station 2 and the lower station 3, the upper side horizontal placing table 5 and the lower side horizontal placing table 6 move in the horizontal direction and move to the empty space side.

For example, in a case where the lifting and lowering placing table 10 is in the upper station 2 in the rear area R, the other lifting and lowering placing table 11 is in the lower station 3 in the front area F.

When a focus is placed on the upper station 2, the lifting and lowering placing table 10 is in the rear area R, and the upper side horizontal placing table 5 is in the front area F. The heights of the lifting and lowering table 80 of the lifting and lowering placing table 10 and the moving table 40 of the upper side horizontal placing table 5 are the same. More specifically, the height of a placing surface of the conveyor unit 81 of the lifting and lowering placing table 10 and the height of a placing surface of the conveyor unit 41 of the upper side horizontal placing table 5 are the same.

Then, when the lifting and lowering placing table 10 is lowered by driving the lifting and lowering motor 85, the rear area R of the upper station 2 where the lifting and lowering placing table 10 is located before movement becomes in an empty state. In the present embodiment, if the rear area R of the upper station 2 becomes in an empty state, the upper side horizontal placing table 5 of the upper station 2 moves to fill a location where the lifting and lowering placing table 10 used to exist. That is, the upper side horizontal placing table 5 moves from the front area F to the rear area R. As a result, the upper station 2 has the front area F in an empty state.

The above similarly applies to the lower station 3, and the lifting and lowering placing table 11 is in the front area F, and the lower side horizontal placing table 6 is in the rear area R. The heights of the lifting and lowering table 80 of the lifting and lowering placing table 11 and the moving table 60 of the lower side horizontal placing table 6 are the same. More specifically, the height of a placing surface of the conveyor unit 81 of the lifting and lowering placing table 11 and the height of a placing surface of the conveyor unit 61 of the lower side horizontal placing table 6 are the same.

When the lifting and lowering placing table 11 moves up in a state where the lifting and lowering placing table 11 is in the front area F and the lower side horizontal placing table 6 is in the rear area R, the lower side horizontal placing table 6 of the lower station 3 moves and fills a location where the lifting and lowering placing table 11 used to exist. That is, the lower side horizontal placing table 6 moves from the rear area R to the front area F. As a result, the lower station 3 has the rear area R in an empty state.

Then, when the lifting and lowering placing table 10 on the rear area R side further moves down and the lifting and lowering placing table 11 on the front area F side moves up, the lifting and lowering placing table 10 on the rear area R side reaches the lower station 3, and the lifting and lowering placing table 11 on the front area F side reaches the upper station 2. Then, the lifting and lowering placing table 10 and the lifting and lowering placing table 11 are accommodated in portions in an empty state.

Next, a series of operations when the conveyance objects 100 and 101 are moved up and down using the lifting device 1 will be described with reference to FIGS. 10A, 10B, 10C and subsequent diagrams. In this embodiment, there are an upper conveyor 15 and a lower conveyor 16 as equipment attached to the lifting device 1. The upper conveyor 15 is at the same height as the upper station 2 of the lifting device 1. More specifically, the height of a placing surface of the upper conveyor 15 is the same as the height of a placing surface of the conveyor unit 41 of the upper side horizontal placing table 5. The lower conveyor 16 is at the same height as the lower station 3 of the lifting device 1. More specifically, the height of a placing surface of the lower conveyor 16 is the same as the height of a placing surface of the conveyor unit 61 of the lower side horizontal placing table 6.

Figure 10A:
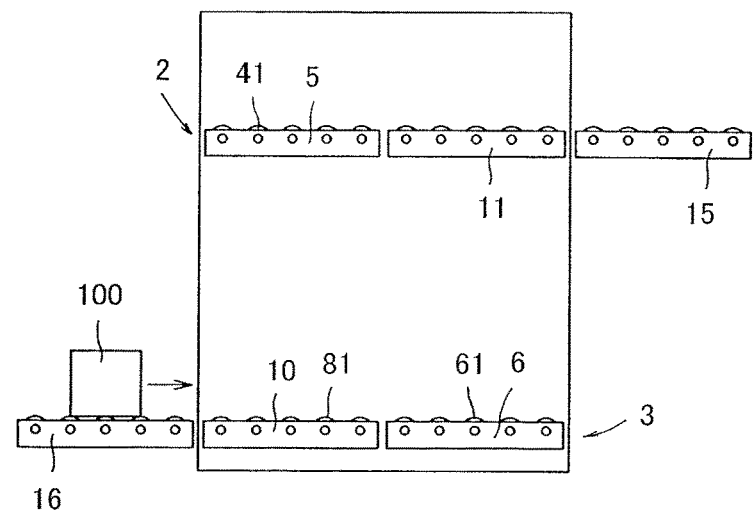
FIGS. 10A to 10C are explanatory views showing operation of the lifting device of FIG. 1.
Figure 10B:
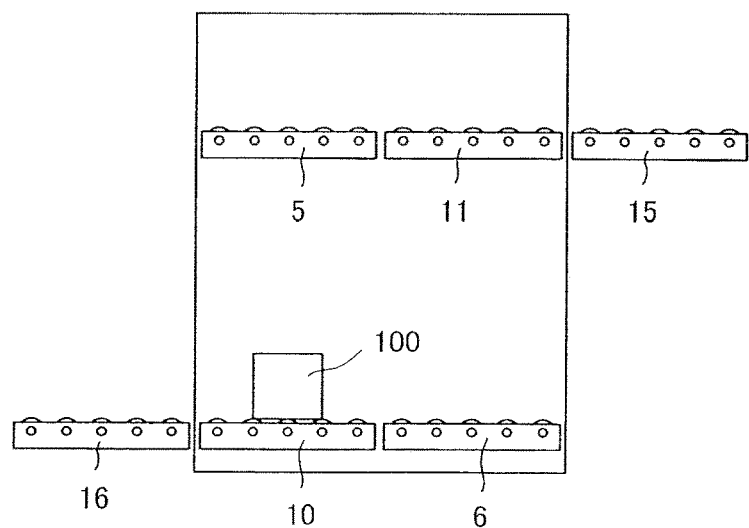

In FIG. 10A, the lifting and lowering placing table 10 is in the lower station 3 in the rear area R, and the lifting and lowering placing table 11 is in the upper station 2 in the front area F.

In this situation, when the first conveyance object 100 is placed and transferred onto the lower conveyor 16 as shown in FIG. 10A and reaches the lifting device 1, the height of the lifting and lowering placing table 10 on the lower side and the height of the lower conveyor 16 match with each other in the lower station 3. For this reason, by driving the conveyor unit 81 of the lifting and lowering placing table 10, the first conveyance object 100 can be drawn onto the lifting and lowering placing table 10 as shown in FIG. 10B.

Figure 10C:
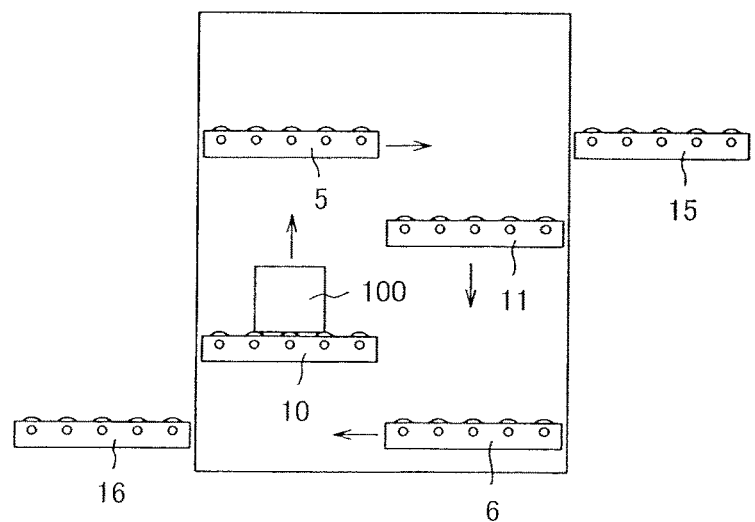

Then, when the lifting and lowering placing table 10 is moved up as shown in FIG. 10C, the rear area R of the lower station 3 where the lifting and lowering placing table 10 used to exist becomes in an empty state. Further, the front area F of the upper station 2 where the lifting and lowering placing table 11 used to exist becomes in an empty state.

Figure 11A:
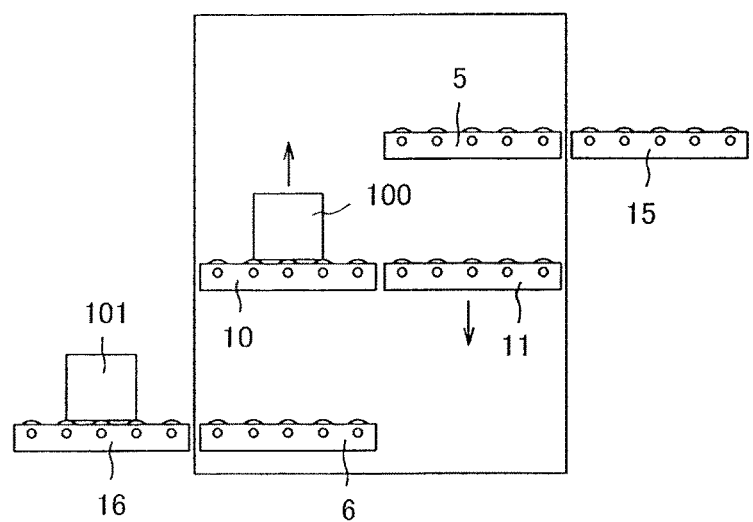
FIGS. 11A to 11C are explanatory views showing the operation of the lifting device following FIGS. 10A to 10C.

In this state, as shown by an arrow in FIG. 10C, the upper side horizontal placing table 5 and the lower side horizontal placing table 6 horizontally move in the stations 2 and 3, and each moves to a location that has just became in an empty state as shown in FIG. 11A. As a result, as shown in FIG. 11A, each of the moving destinations of the lifting and lowering placing tables 10 and 11 becomes in an empty state. That is, the rear area R of the upper station 2 above the lifting and lowering placing table 10 that is moving up becomes in an empty state, and the front area F of the lower station 3 below the lifting and lowering placing table 11 that is moving down becomes in an empty state.

Figure 11B:
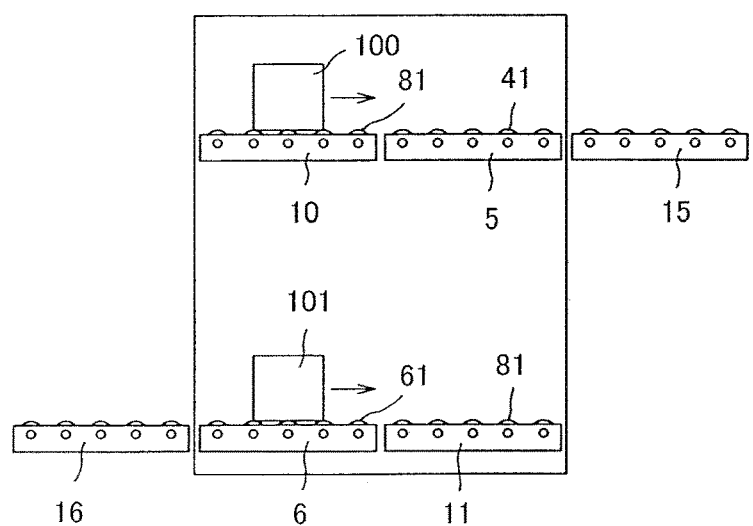

Then, as shown in FIG. 11B, the lifting and lowering placing table 10 reaches the upper station 2, and the lifting and lowering placing table 10 is located at the position where the upper side horizontal placing table 5 used to exist (the rear area R of the upper station 2). As a result, the heights of the lifting and lowering placing table 10 and the upper side horizontal placing table 5 are aligned, and the conveyor units 81 and 41 of both the lifting and lowering placing table 10 and the upper side horizontal placing table 5 form a series of conveying passages.

Figure 11C:
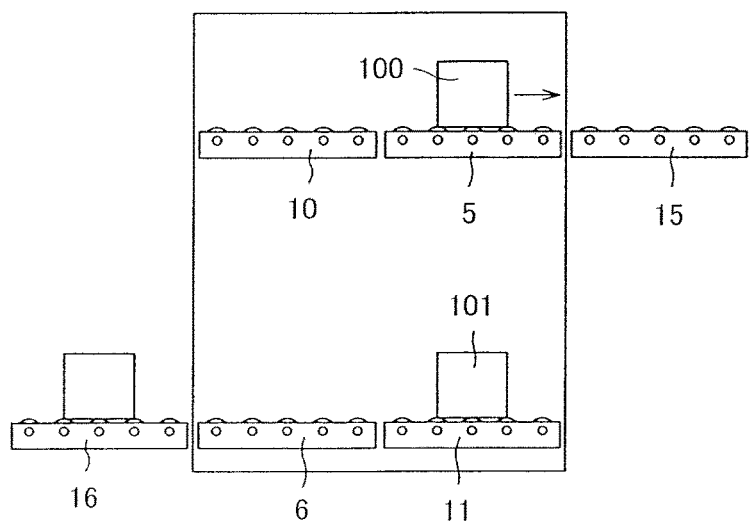
Figure 12A:
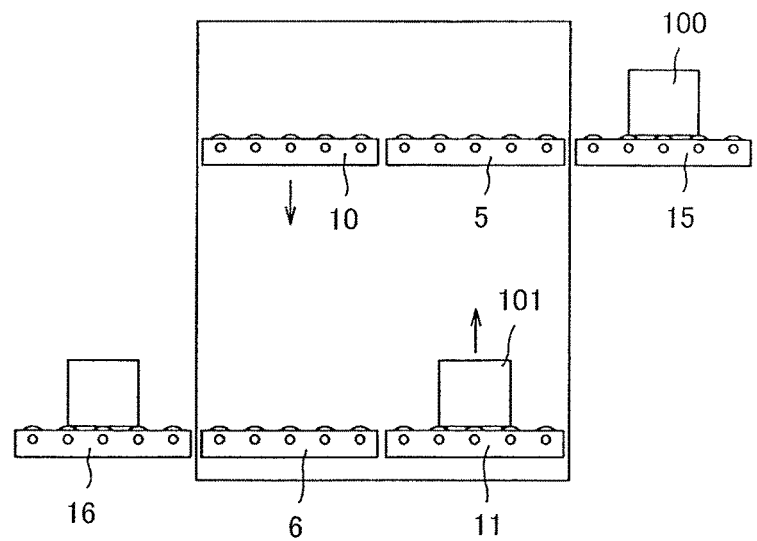
FIGS. 12A to 12C are explanatory views showing the operation of the lifting device following FIGS. 11A to 11C.

Then, the conveyor units 81 and 41 of both the lifting and lowering placing table 10 and the upper side horizontal placing table 5 are driven, and, as shown in FIG. 11C, the first conveyance object 100 is transferred from the lifting and lowering placing table 10 to the upper side horizontal placing table 5, and finally, as shown in FIG. 12A, the first conveyance object 100 is discharged from the lifting device 1 to the upper conveyor 15.

On the other hand, when a focus is placed on the lower station 3, as shown in FIG. 11B, the heights of the lower side horizontal placing table 6 and the lifting and lowering placing table 11 match with each other also in the lower station 3, and the conveyor units 81 and 61 of both the lower side horizontal placing table 6 and the lifting and lowering placing table 11 constitute a series of conveying passages.

Here, when the second conveyance object 101 reaches the lifting device 1, the second conveyance object 101 is drawn onto the lower side horizontal placing table 6 as shown in FIG. 11B, and advances to the adjacent lifting and lowering placing table 11 as shown in FIGS. 11C and 12A.

Figure 12B:
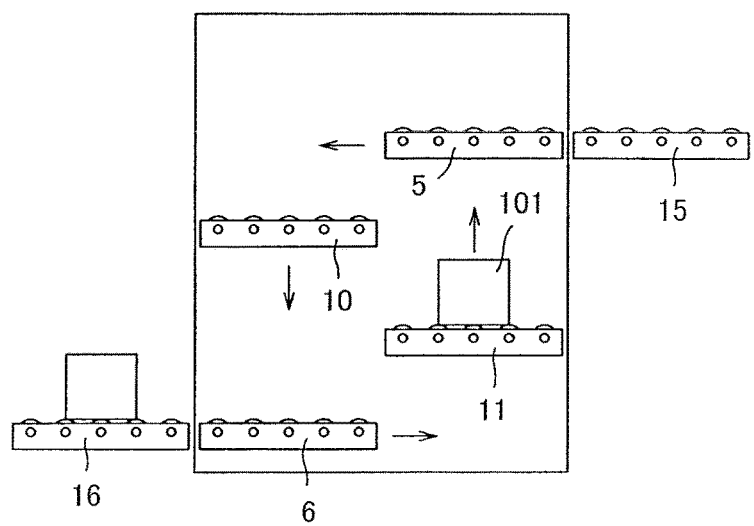

Next, as shown in FIG. 12B, when the lifting and lowering placing table 10 on the rear area R side is moved down, the lifting and lowering placing table 11 on the front area F side moves up following the above, and the second conveyance object 101 placed on the lifting and lowering placing table 11 moves up.

Figure 12C:
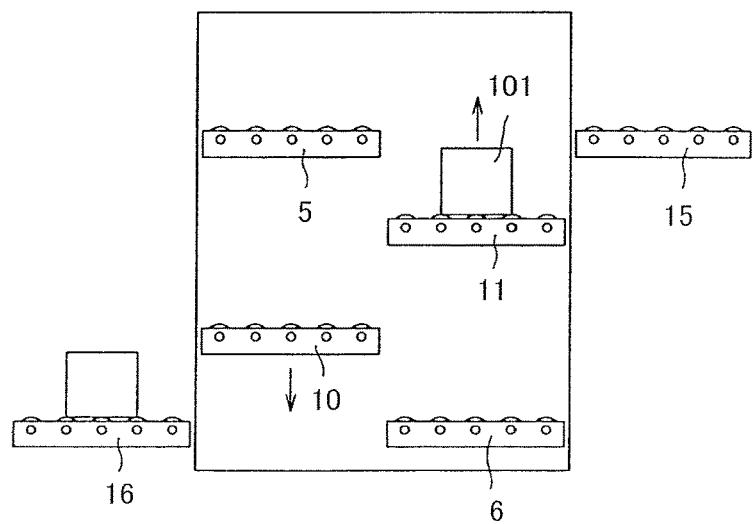

Further, as the lifting and lowering placing table 11 moves up, the front area F of the lower station 3 becomes in an empty state, and the lower side horizontal placing table 6 moves horizontally to fill the position where the lifting and lowering placing table 11 used to exist as shown in FIGS. 12B and 12C.

Similarly, for the upper station 2 as well, the rear area R becomes in an empty state as the lifting and lowering placing table 10 moves down, and the upper side horizontal placing table 5 moves horizontally to fill the position where the lifting and lowering placing table 10 used to exist as shown in FIGS. 12B and 12C.

Figure 13A:
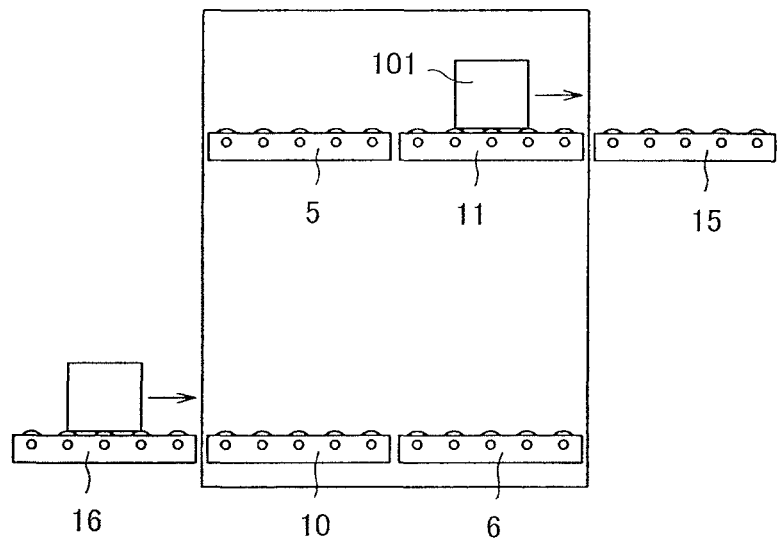
FIGS. 13A and 13B are explanatory views showing the operation of the lifting device following FIGS. 12A to 12C.
Figure 13B:
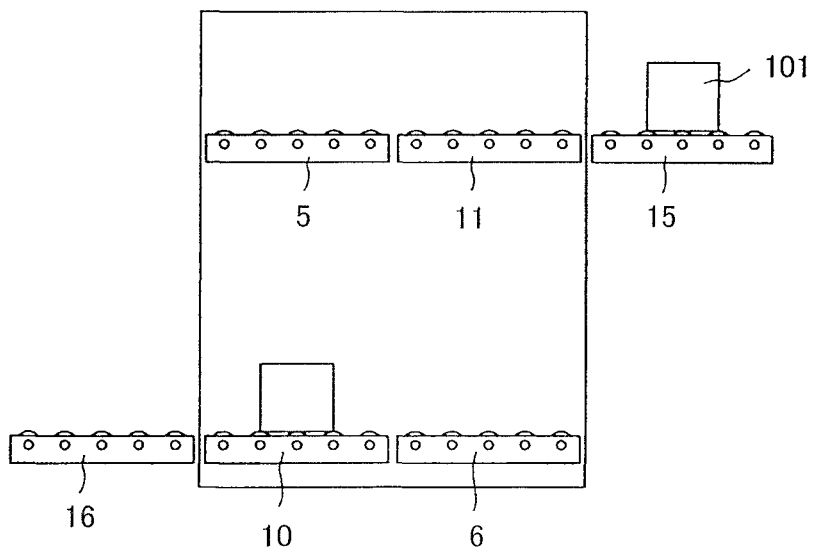

Then, as shown in FIG. 13A and FIG. 13B, the conveyance object 101 is discharged from the lifting and lowering placing table 11 to the upper conveyor 15.

Hereinafter, the series of operations described above are repeated, and the conveyance object is continuously transferred from the lower conveyor 16 to the upper conveyor 15.

In the lifting device 1 of the present embodiment, while one of the areas R and F is moved up to discharge the conveyance object 100 that reaches the upper station 2, a new conveyance object can be carried into the lower station 3 in the other one of the areas R and F. For this reason, the conveyance object can be carried to the upper side without wasting of time.

Further, in the embodiment described above, the upper conveyor 15 and the lower conveyor 16 are installed one by one as the equipment attached to the lifting device 1. That is, the upper conveyor 15 and the lower conveyor 16 are installed only on one side-surface of the lifting device 1. However, as shown in FIG. 15, two of the upper conveyors 15 and two of the lower conveyors 16 may be installed as equipment attached to the lifting device 1. That is, the configuration may be such that upper conveyors 15a and 15b are provided on both side-surfaces of the upper station 2 of the lifting device 1, and lower conveyors 16a and 16b are provided on both side-surfaces of the lower station 3.

In the embodiment described above, a case where the conveyance object 100 is carried from below to above is described. However, the lifting device 1 of the present embodiment can also be used for carrying the conveyance object 100 from above to below. From which side-surface side of the lifting device 1, that is, from which of a first side-surface side or a second-side-surface side of the lifting device 1 a conveyance object is carried in, and from which side-surface side a conveyance object is carried out, are optional.

A possible carrying route is illustrated in FIG. 15.

In the embodiment shown in FIG. 15, the lower station 3 can carry in and out a conveyance object from both side-surface sides of the lifting device 1, that is, the first side-surface side and the second side-surface side of the lifting device 1. The upper station 2 can also carry in and carry out a conveyance object from both side-surface sides of the lifting device 1.

Figure 15A:
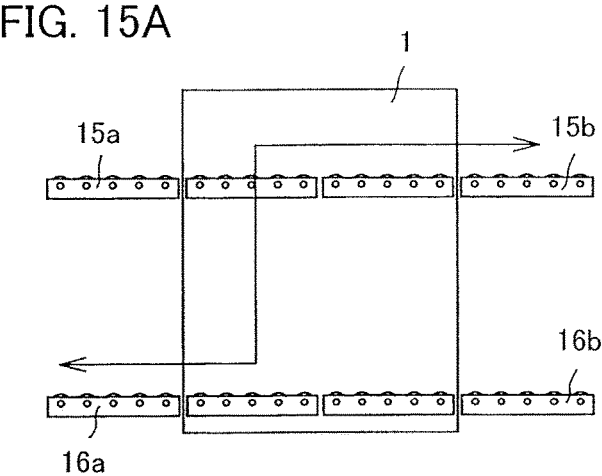
FIGS. 15A to 15D are explanatory views showing a moving route of a conveyance object in the lifting device of FIG. 1.
Figure 15B:
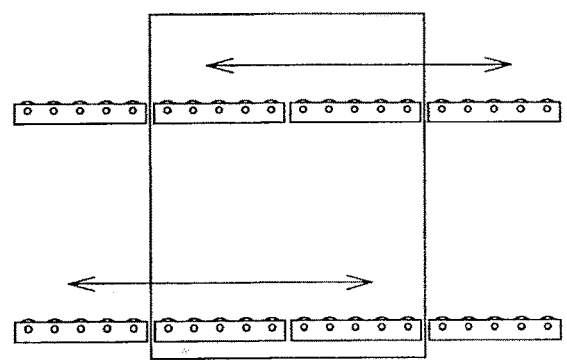
Figure 15C:
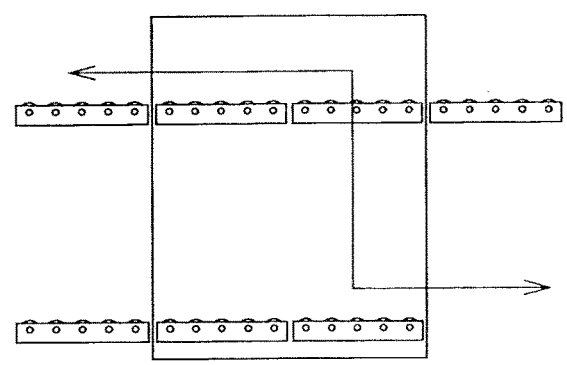

FIGS. 15A and 15C show a stepwise linear ascending route in which the lower station 3 carries in a conveyance object from one side-surface of the lifting device 1 and the upper station 2 carries out the conveyance object without changing a carrying direction, and a stepwise linear descending route in which the upper station 2 carries in a conveyance object from one side-surface of the lifting device 1 and the lower station 3 carries out the conveyance object without changing a carrying direction.

In other words, FIGS. 15A and 15C show a first route, in which a conveyance object is carried in from the first side-surface side in the lower station 3 and the conveyance object is carried out to the second side-surface side in the upper station 2, or a conveyance object is carried in from the second side-surface side in the lower station 3 and the conveyance object is carried out to the first side-surface side in the upper station 2. Furthermore, FIGS. 15A and 15C show a fourth route, in which a conveyance object is carried in from the first side-surface side in the upper station 2 and a conveyance object is carried out to the second side-surface side in the lower station 3, or a conveyance object is carried in from the second side-surface side in the upper station 2 and a conveyance object is carried out to the first side-surface side in the lower station 3.

FIG. 15B shows a lower side linear carrying route in which the lower station 3 carries in a conveyance object from one side-surface of the lifting device 1 and carries out the conveyance object from the other side-surface of the lower station 3, and an upper side linear carrying route in which the upper station 2 carries in a conveyance object from one side-surface of the lifting device 1 and carries out a conveyance object from the other side-surface of the upper station 2.

In other words, FIG. 15B shows a second route, in which a conveyance object is carried in from the first side-surface side in the lower station 3 and a conveyance object is carried out to the second side-surface side in the lower station 3, or a conveyance object is carried in from the second-side-surface side in the lower station 3 and a conveyance object is carried out to the first side-surface side in the lower station 3. Furthermore, 15B shows a fifth route, in which a conveyance object is carried in from the first side-surface side in the upper station 2 and a conveyance object is carried out to the second side-surface side in the upper station 2, or a conveyance object is carried in from the second side-surface side in the upper station 2 and a conveyance object is carried out to the first side-surface side in the upper station 2.

Figure 15D:
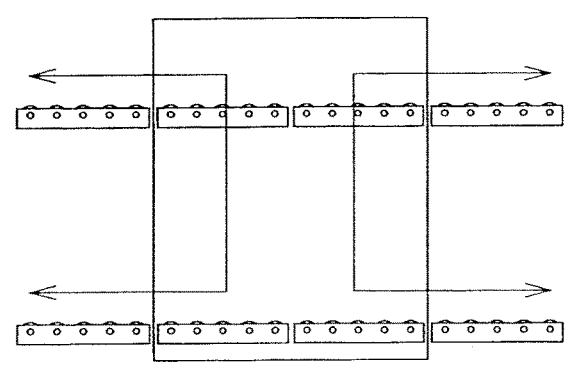

FIG. 15D shows a stepwise U-turn ascending route in which the lower station 3 carries in a conveyance object from one of the side-surfaces of the lifting device 1 and the upper station 2 carries out the conveyance object in an opposite direction to a carrying-in direction of a conveyance object, and a stepwise U-turn descending route in which the upper station 2 carries in a conveyance object from one of the side-surfaces of the lifting device 1 and the lower station 3 carries out the conveyance object in an opposite direction to a carrying-in direction of a conveyance object.

In other words, FIG. 15D shows a third route, in which a conveyance object is carried in from the first side-surface side in the lower station 3 and a conveyance object is carried out to the first side-surface side in the upper station 2, or a conveyance object is carried in from the second side-surface side in the lower station 3 and a conveyance object is carried out to the second side-surface side in the upper station 2. Furthermore, 15D shows a sixth route, in which a conveyance object is carried in from the first side-surface side in the upper station 2 and a conveyance object is carried out to the first side-surface side in the lower station 3, or a conveyance object is carried in from the second side-surface side in the upper station 2 and a conveyance object is carried out to the second side-surface side in the lower station 3.

In a case where the lifting device 1 is used as a sorting device, it is desirable that each of the routes described above can be switched according to a predetermined signal.

It is desirable that, at least any of the stepwise linear direction route (the first route or the fourth route) and any of the linear advancing route (the second route or the fifth route) can be selected, and a discharge direction can be changed in accordance with a conveyance object.

In the embodiment described above, there are two of the areas R and F in the frame 20, and two of the lifting and lowering placing tables 10 and 11 are disposed. However, the configuration may be such that the inside of the frame 20 is divided into three or more of the areas R and F, and three or more of the lifting and lowering placing tables are disposed.

However, in this case, a separate power source for lifting and lowering needs to be provided on each of the lifting and lowering placing tables 10 and 11. Further, a plurality of horizontal placing tables need to be provided in each of the stations 2 and 3.

Figure 16:
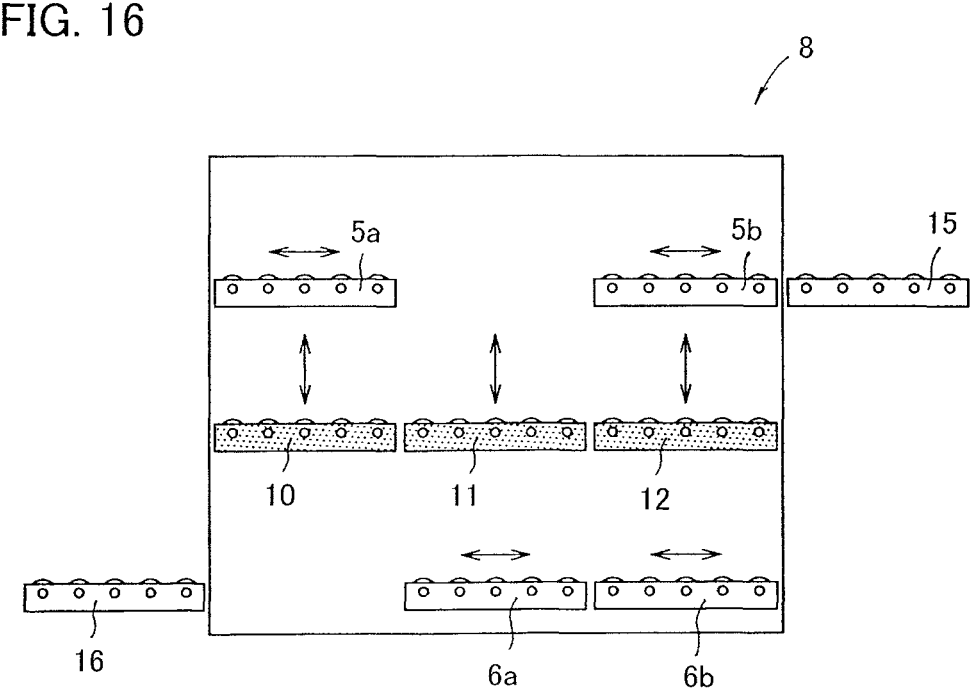
FIG. 16 is a schematic view of the lifting device according to still another embodiment of the present invention.

FIG. 16 shows a lifting device 8 including three of the lifting and lowering placing tables 10, 11, and 12. In the lifting device 8, the upper station 2 is provided with two upper side horizontal placing tables 5a and 5b. Further, the lower station 2 is also provided with two lower side horizontal placing tables 6a and 6b. In FIG. 16, the lifting and lowering placing tables 10, 11, and 12 are shaded.

Also in the lifting device 8 of the present embodiment, when any of the lifting and lowering placing tables 10, 11, and 12 is in the upper station 2, the upper side horizontal placing tables 5a and 5b are at positions adjacent to the lifting and lowering placing tables 10, 1, and 12, and a series of conveying passages is formed. The above similarly applies when any of the lifting and lowering placing tables 10, 11, and 12 is in the lower station 3, and the lower side horizontal placing tables 6a and 6b are at positions adjacent to the lifting and lowering placing tables 10, 11, and 12, and a series of conveying passages is formed.

When the lifting and lowering placing tables 10, 11, and 12 move away from the upper station 2 or the lower station 3, the upper side horizontal placing tables 5a and 5b or the lower side horizontal placing tables 6a and 6b move to a position where the lifting and lowering placing tables 10, 11, and 12 used to exist.

Further, the above-described embodiment has a two-story structure, and there is only one of the upper station 2 on the lower station 3. However, a multi-stage structure can also be employed.

FIG. 17 shows a lifting device 13 having a three-story structure having two stages of upper stations.

The lifting device 13 has a third-floor station (upper station) 35 and a second-floor station (upper station) 36. The structure of the third-floor station 35 is the same as that of the previous embodiment, and has the upper side horizontal placing table 5.

The second-floor station 36 is a floor between the lower station 3 and the third-floor station 35, and has a height that is closer to the lower station 3 than the middle between the lower station 3 and the third-floor station 35.

The second-floor station 36 has an upper side horizontal placing table 37.

Figure 17A:
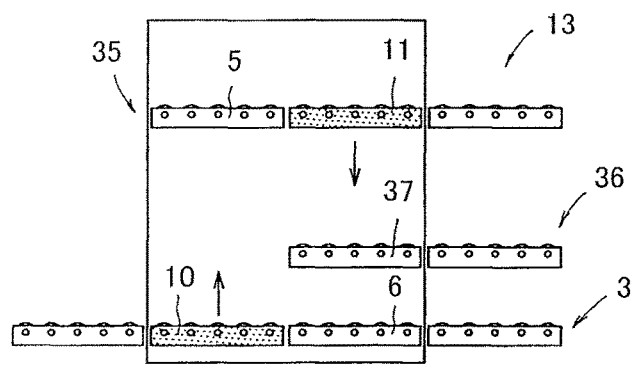
FIGS. 17A to 17D are explanatory views showing an outline of the lifting device and operation of the lifting device according to another embodiment of the present invention.

A case where the lifting and lowering placing table 10 is in the lower station 3 as shown in FIG. 17A, the lifting and lowering placing table 11 is in the third-floor station 35, the lifting and lowering placing table 10 is moved to the third-floor station 35, and the lifting and lowering placing table 11 is moved to the lower station 3 will be described.

In this case, as shown in FIG. 17A, the upper side horizontal placing table 37 of the second-floor station 36 is in the front area F, and the rear area R is in an empty state.

In this state, the lifting and lowering placing table 10 in the rear area R is moved up and is caused to pass through the rear area R of the second-floor station that becomes in an empty state.

Figure 17B:
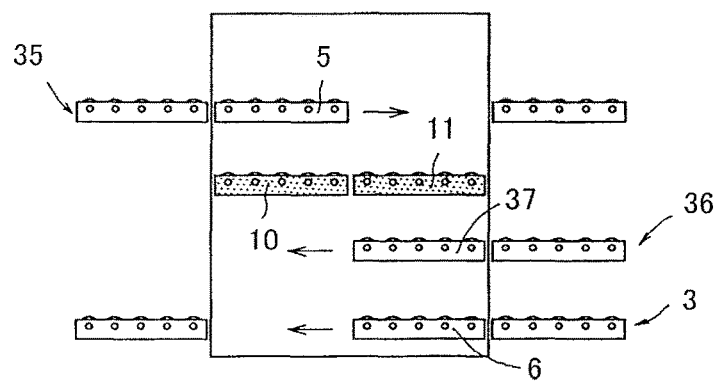

The lifting and lowering placing table 10 in the rear area R and the lifting and lowering placing table 1 in the front area F, which operate synchronously, intersect at a position above the second-floor station 36 as shown in FIG. 17B.

Figure 17C:
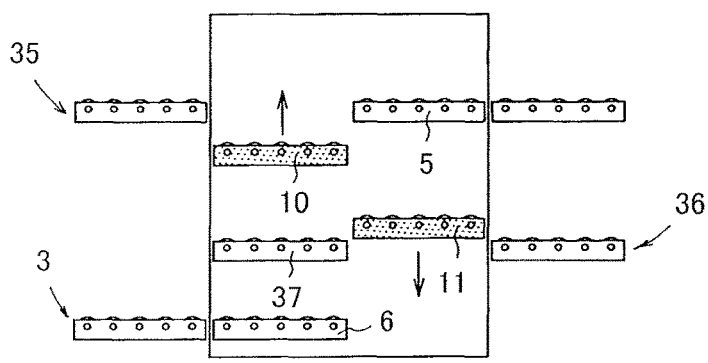

Then, at a timing that the lifting and lowering placing table 10 in the rear area R passes through the second-floor station 36, the upper side horizontal placing table 37 of the second-floor station 36 is moved from the front area F to the rear area R as shown in FIG. 17C to make the front area F an empty state. The lifting and lowering placing table 11 in the front area F continues to descend and passes through the front area F of the second-floor station 36 that becomes in an empty state.

Figure 17D:
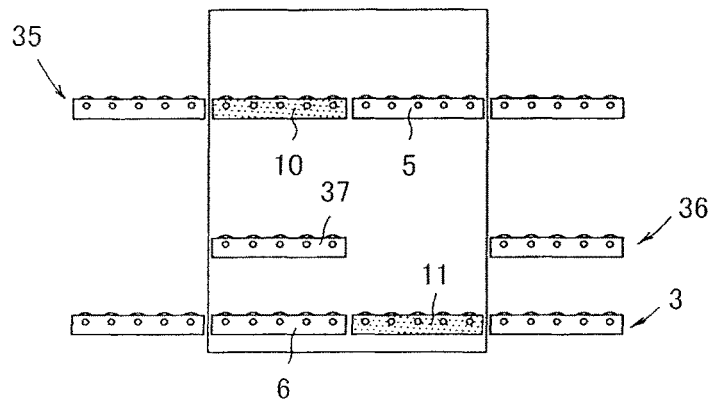

Then, finally, as shown in FIG. 17D, the lifting and lowering placing table 10 in the rear area R reaches the third-floor station 35, and the lifting and lowering placing table 11 in the front area F reaches the lower station 3.

Further, in the lifting device 13 of the present embodiment, a conveyance object can be carried out to the second-floor station 36, or a conveyance object can be carried in from the second-floor station 36.

In the lifting device 13 of the present embodiment, the second-floor station 36 is located between the lower station 3 and the third-floor station 35, and is closer to the lower station 3 than the middle between the lower station 3 and the third-floor station 35. However, the second-floor station 36 may be at a position closer to the third-floor station 35 side.

The linear member 98 is not limited to a wire, and a chain, a rope, a belt, or the like can also be employed.

Further, in the above-described embodiment, the lifting and lowering motor 85 as a power source for lifting and lowering is mounted on both the lifting and lowering placing tables 10 and 11. However, the configuration may be such that the lifting and lowering motor 85 is mounted only on one of the lifting and lowering placing tables 10 and 11, and the other is driven by the linear member 98.

In the embodiment described above, the lifting and lowering motor 85 as a power source for lifting and lowering is mounted on the lifting and lowering placing tables 10 and 11. However, the configuration may be such that the lifting and lowering motor is installed on the frame 20 side, and the lifting and lowering placing tables 10 and 11 are lifted and lowered by operation of winding up and the like of the linear member 98.

Further, the power of the lifting and lowering motor 85 may be transmitted to the conveyor unit 81 by switching with a clutch or the like so that the conveyor unit 81 is driven.

Similarly, in the above-described embodiment, the traveling motors 45 and 65 are provided on the upper side horizontal placing table 5 and the lower side horizontal placing table 6, respectively. However, the configuration may be such that the travel motor is provided on only one of them. Then, the upper side horizontal placing table 5 and the lower side horizontal placing table 6 may be connected by the linear member 98, such as a wire or a chain, one of the upper side horizontal placing table 5 and the lower side horizontal placing table 6 may be caused to travel by the traveling motor, and the other may be forced to follow the one.

Further, the upper side horizontal placing table 5 and the lower side horizontal placing table 6 may be caused to travel synchronously by operation, such as linearly moving the linear member, by installing a traveling motor on the frame 20 side.

EXPLANATION OF REFERENCE SIGNS 1, 8, 13: Lifting device (sorting device)
2 Upper station
3 Lower station
5 Upper side horizontal placing table
6 Lower side horizontal placing table
10, 11, 12: Lifting and lowering placing table
17: Pulley
41: Conveyor unit
45: Traveling motor 65: Traveling motor
61: Conveyor unit
80: Lifting and lowering table
81: Conveyor unit
85: Lifting and lowering motor
98: Linear member

The invention claimed is:

1. A lifting device comprising:
an upper station;
a lower station;
a plurality of lifting and lowering placing tables that move in a vertical direction between the upper station and the lower station;
   one or a plurality of upper side horizontal placing tables that move horizontally in the upper station; and
   one or a plurality of lower side horizontal placing tables that move horizontally in the lower station,
   wherein when one of the lifting and lowering placing tables is in the upper station, the upper side horizontal placing table is at a position adjacent to the lifting and lowering placing table, and the upper side horizontal placing table and the lifting and lowering placing table form a series of conveying passage,
   wherein when the lifting and lowering placing table moves away from the upper station, the upper side horizontal placing table moves to a position where the lifting and lowering placing table used to exist,
   wherein when one of the lifting and lowering placing tables is in the lower station, the lower side horizontal placing table is at a position adjacent to the lifting and lowering placing table, and the lower side horizontal placing table and the lifting and lowering placing table form a series of conveying passage, and
   wherein when the lifting and lowering placing table moves away from the lower station, the lower side horizontal placing table moves to a position where the lifting and lowering placing table used to exist.

2. The lifting device according to claim 1, wherein the lifting and lowering placing table, the upper side horizontal placing table, and the lower side horizontal placing table are all provided with a conveyor device.

3. The lifting device according to claim 1,
   wherein the plurality of lifting and lowering placing tables are connected by a linear member,
   wherein the plurality of lifting and lowering placing tables comprise a first and a second lifting and lowering placing tables, and
   wherein when the first lifting and lowering placing table moves upward, the second lifting and lowering placing table moves downward, and when the first lifting and lowering placing table moves downward, the second lifting and lowering placing table moves upward.

4. The lifting device according to claim 1, further comprising a first side-surface side and a second side-surface side,
   wherein the lower station is configured to carry in and/or carry out a conveyance object from the first side-surface side and/or the second side-surface side of the lifting device,
   wherein the upper station is configured to carry in and/or carry out a conveyance object from the first side-surface side and/or the second side-surface side of the lifting device, and
   wherein the lifting device is configured to carry a conveyance object through at least any of following routes:
   (1) a first route configured to carry in a conveyance object from the first side-surface side in the lower station and to carry out the conveyance object to the second side-surface side in the upper station, or configured to carry in a conveyance object from the second side-surface side in the lower station and to carry out the conveyance object to the first side-surface side in the upper station;
   (2) a second route configured to carry in a conveyance object from the first side-surface side in the lower station and to carry out the conveyance object to the second side-surface side in the lower station, or configured to carry in a conveyance object from the second side-surface side in the lower station and to carry out the conveyance object to the first side-surface side in the lower station;
   (3) a third route configured to carry in a conveyance object from the first side-surface side in the lower station and to carry out the conveyance object to the first side-surface side in the upper station, or configured to carry in a conveyance object from the second side-surface side in the lower station and to carry out the conveyance object to the second side-surface side in the upper station;
   (4) a fourth route configured to carry in a conveyance object from the first side-surface side in the upper station and to carry out the conveyance object to the second side-surface side in the lower station, or configured to carry in a conveyance object from the second side-surface side in the upper station and to carry out the conveyance object to the first side-surface side in the lower station;
   (5) a fifth route configured to carry in a conveyance object from the first side-surface side in the upper station and to carry out the conveyance object to the second side-surface side in the upper station, or configured to carry in a conveyance object from the second side-surface side in the upper station and to carry out the conveyance object to the first side-surface side in the upper station; and
   (6) a sixth route configured to carry in a conveyance object from the first side-surface side in the upper station and to carry out the conveyance object to the first side-surface side in the lower station, or configured to carry in a conveyance object from the second side-surface side in the upper station and to carry out the conveyance object to the second side-surface side in the lower station.

5. The lifting device according to claim 1 further comprising a plurality of the upper stations.

6. The lifting device according to claim 2,
   wherein the plurality of lifting and lowering placing tables are connected by a linear member,
   wherein the plurality of lifting and lowering placing tables comprise a first and a second lifting and lowering placing tables, and
   wherein when the first lifting and lowering placing table moves upward, the second lifting and lowering placing table moves downward, and when the first lifting and lowering placing table moves downward, the second lifting and lowering placing table moves upward.

7. The lifting device according to claim 2, further comprising a first side-surface side and a second side-surface side,
   wherein the lower station is configured to carry in and/or carry out a conveyance object from the first side-surface side and/or the second side-surface side of the lifting device, wherein the upper station is configured to carry in and/or carry out a conveyance object from the first side-surface side and/or the second side-surface side of the lifting device, and wherein the lifting device is configured to carry a conveyance object through at least any of following routes:
(1) a first route configured to carry in a conveyance object from the first side-surface side in the lower station and to carry out the conveyance object to the second side-surface side in the upper station, or configured to carry in a conveyance object from the second side-surface side in the lower station and to carry out the conveyance object to the first side-surface side in the upper station;
(2) a second route configured to carry in a conveyance object from the first side-surface side in the lower station and to carry out the conveyance object to the second side-surface side in the lower station, or configured to carry in a conveyance object from the second side-surface side in the lower station and to carry out the conveyance object to the first side-surface side in the lower station;
(3) a third route configured to carry in a conveyance object from the first side-surface side in the lower station and to carry out the conveyance object to the first side-surface side in the upper station, or configured to carry in a conveyance object from the second side-surface side in the lower station and to carry out the conveyance object to the second side-surface side in the upper station;
(4) a fourth route configured to carry in a conveyance object from the first side-surface side in the upper station and to carry out the conveyance object to the second side-surface side in the lower station, or configured to carry in a conveyance object from the second side-surface side in the upper station and to carry out the conveyance object to the first side-surface side in the lower station;
(5) a fifth route configured to carry in a conveyance object from the first side-surface side in the upper station and to carry out the conveyance object to the second side-surface side in the upper station, or configured to carry in a conveyance object from the second side-surface side in the upper station and to carry out the conveyance object to the first side-surface side in the upper station; and
(6) a sixth route configured to carry in a conveyance object from the first side-surface side in the upper station and to carry out the conveyance object to the first side-surface side in the lower station, or configured to carry in a conveyance object from the second side-surface side in the upper station and to carry out the conveyance object to the second side-surface side in the lower station.

8. The lifting device according to claim 2, further comprising a plurality of the upper stations.

9. The lifting device according to claim 3, further comprising a first side-surface side and a second side-surface side, wherein the lower station is configured to carry in and/or carry out a conveyance object from the first side-surface side and/or the second side-surface side of the lifting device, wherein the upper station is configured to carry in and/or carry out a conveyance object from the first side-surface side and/or the second side-surface side of the lifting device, and wherein the lifting device is configured to carry a conveyance object through at least any of following routes:
(1) a first route configured to carry in a conveyance object from the first side-surface side in the lower station and to carry out the conveyance object to the second side-surface side in the upper station, or configured to carry in a conveyance object from the second side-surface side in the lower station and to carry out the conveyance object to the first side-surface side in the upper station;
(2) a second route configured to carry in a conveyance object from the first side-surface side in the lower station and to carry out the conveyance object to the second side-surface side in the lower station, or configured to carry in a conveyance object from the second side-surface side in the lower station and to carry out the conveyance object to the first side-surface side in the lower station;
(3) a third route configured to carry in a conveyance object from the first side-surface side in the lower station and to carry out the conveyance object to the first side-surface side in the upper station, or configured to carry in a conveyance object from the second side-surface side in the lower station and to carry out the conveyance object to the second side-surface side in the upper station;
(4) a fourth route configured to carry in a conveyance object from the first side-surface side in the upper station and to carry out the conveyance object to the second side-surface side in the lower station, or configured to carry in a conveyance object from the second side-surface side in the upper station and to carry out the conveyance object to the first side-surface side in the lower station;
(5) a fifth route configured to carry in a conveyance object from the first side-surface side in the upper station and to carry out the conveyance object to the second side-surface side in the upper station, or configured to carry in a conveyance object from the second side-surface side in the upper station and to carry out the conveyance object to the first side-surface side in the upper station; and
(6) a sixth route configured to carry in a conveyance object from the first side-surface side in the upper station and to carry out the conveyance object to the first side-surface side in the lower station, or configured to carry in a conveyance object from the second side-surface side in the upper station and to carry out the conveyance object to the second side-surface side in the lower station.

10. The lifting device according to claim 3, further comprising a plurality of the upper stations.

11. The lifting device according to claim 4, further comprising a plurality of the upper stations.

12. A sorting device comprising:
a plurality of stations disposed at positions having different heights, each of the stations having a plurality of areas in which a placing table is disposed;
a plurality of lifting and lowering placing tables that move between the stations, the plurality of lifting and lowering placing tables comprising a first and second lifting and lowering placing tables; and
horizontal placing tables provided in each of the stations, the horizontal placing tables moving horizontally in each of the stations,
wherein when the first lifting and lowering placing table is in one of the areas in one of the stations, the horizontal placing table in the one of the stations is provided adjacent to the first lifting and lowering placing table, so that the horizontal placing table and the first lifting and lowering placing table form a series of conveying passage, and wherein when the first lifting and lowering placing table moves away from the station, the horizontal placing table moves to a position where the first lifting and lowering placing table used to exist, and an area where the horizontal placing table used to exist becomes empty, thereby the second lifting and lowering placing table being accommodated in the area that becomes empty.

\* \* \* \* \*

UNITED STATES PATENT AND TRADEMARK OFFICE
CERTIFICATE OF CORRECTION

PATENT NO. : 10,766,714 B2
APPLICATION NO. : 16/621817
DATED : September 8, 2020
INVENTOR(S) : Kazuo Itoh et al.

Page 1 of 1

It is certified that error appears in the above-identified patent and that said Letters Patent is hereby corrected as shown below:

On the Title Page

The title should read as follows:
(54) LIFTING DEVICE AND SORTING DEVICE

Signed and Sealed this
Tenth Day of November, 2020

Andrei Iancu
*Director of the United States Patent and Trademark Office*